(12) United States Patent
Ogura et al.

(10) Patent No.: US 7,433,286 B2
(45) Date of Patent: Oct. 7, 2008

(54) JITTER DETECTION APPARATUS

(75) Inventors: Youichi Ogura, Ibaraki (JP); Toshihiko Takahashi, Kawachinagano (JP); Shinichi Konishi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 333 days.

(21) Appl. No.: 11/372,051

(22) Filed: Mar. 10, 2006

(65) Prior Publication Data

US 2006/0208766 A1      Sep. 21, 2006

(30) Foreign Application Priority Data

Mar. 10, 2005   (JP) .............................. 2005-066457

(51) Int. Cl.
  *G11B 7/00* (2006.01)
(52) U.S. Cl. .................. 369/53.34; 369/59.19
(58) Field of Classification Search ....................... None
  See application file for complete search history.

(56) References Cited

U.S. PATENT DOCUMENTS

| | | | | |
|---|---|---|---|---|
| 5,526,339 A | * | 6/1996 | Shimada | 369/59.19 |
| 7,012,862 B2 | * | 3/2006 | Hiratsuka | 369/44.34 |
| 7,274,645 B2 | * | 9/2007 | Urita | 369/59.22 |
| 7,372,797 B2 | * | 5/2008 | Kanaoka et al. | 369/59.22 |
| 2001/0006500 A1 | | 7/2001 | Nakajima et al. | |
| 2003/0021208 A1 | | 1/2003 | Ogura | |
| 2003/0137912 A1 | | 7/2003 | Ogura | |

FOREIGN PATENT DOCUMENTS

| | | |
|---|---|---|
| JP | 2001-250341 | 9/2001 |
| JP | 2002-269925 | 9/2002 |
| JP | 2003-36612 | 2/2003 |

\* cited by examiner

*Primary Examiner*—Joseph Feild
*Assistant Examiner*—Peter Vincent Agustin
(74) *Attorney, Agent, or Firm*—Wenderoth, Lind & Ponack, L.L.P.

(57) ABSTRACT

In a jitter detection apparatus, a playback RF signal 3 detected from an optical disc medium 1 is subjected to waveform shaping, and thereafter, converted into a digital RF signal 6 with a sampling clock having a cycle twice as long as a cycle of a channel clock. Thereafter, an offset variation in a high-frequency band is corrected by an offset correction circuit 9, and data that are missing in the time direction are restored by a Nyquist interpolation filter 23. Then, positions where jitter is to be extracted are selected from an output signal of the Nyquist interpolation filter 23, by a jitter detection preprocessing circuit 28, according to the playback speed of the optical disc medium 1 and the arithmetic capacity of a digital signal operation circuit 29, whereby highly accurate jitters can be extracted by using the digital signal operation circuit 29.

11 Claims, 22 Drawing Sheets

| command | time required for command execution |
|---|---|
| add | X1 |
| sub | X2 |
| mpy | X3 |
| div | X4 |
| ⋮ | ⋮ |

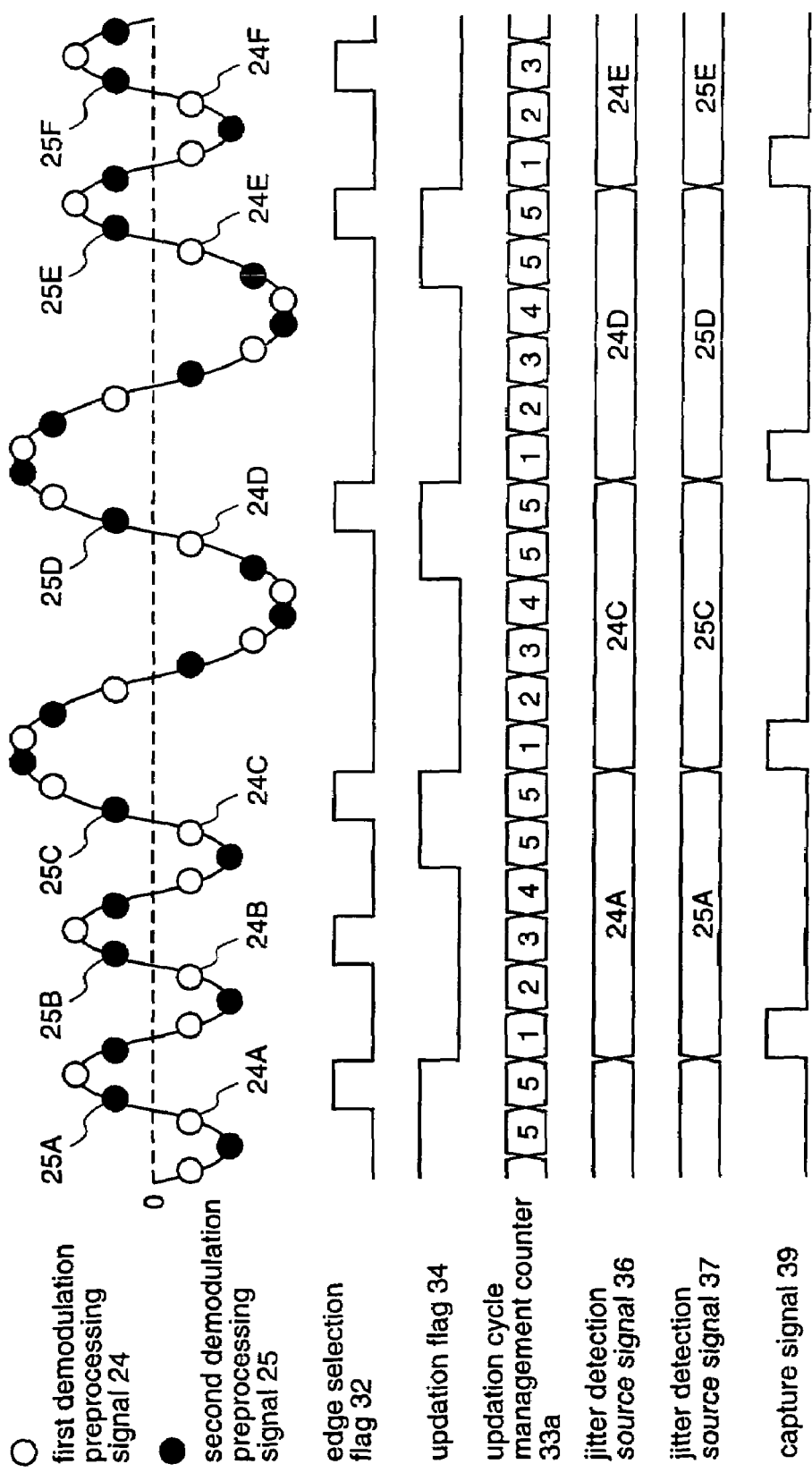

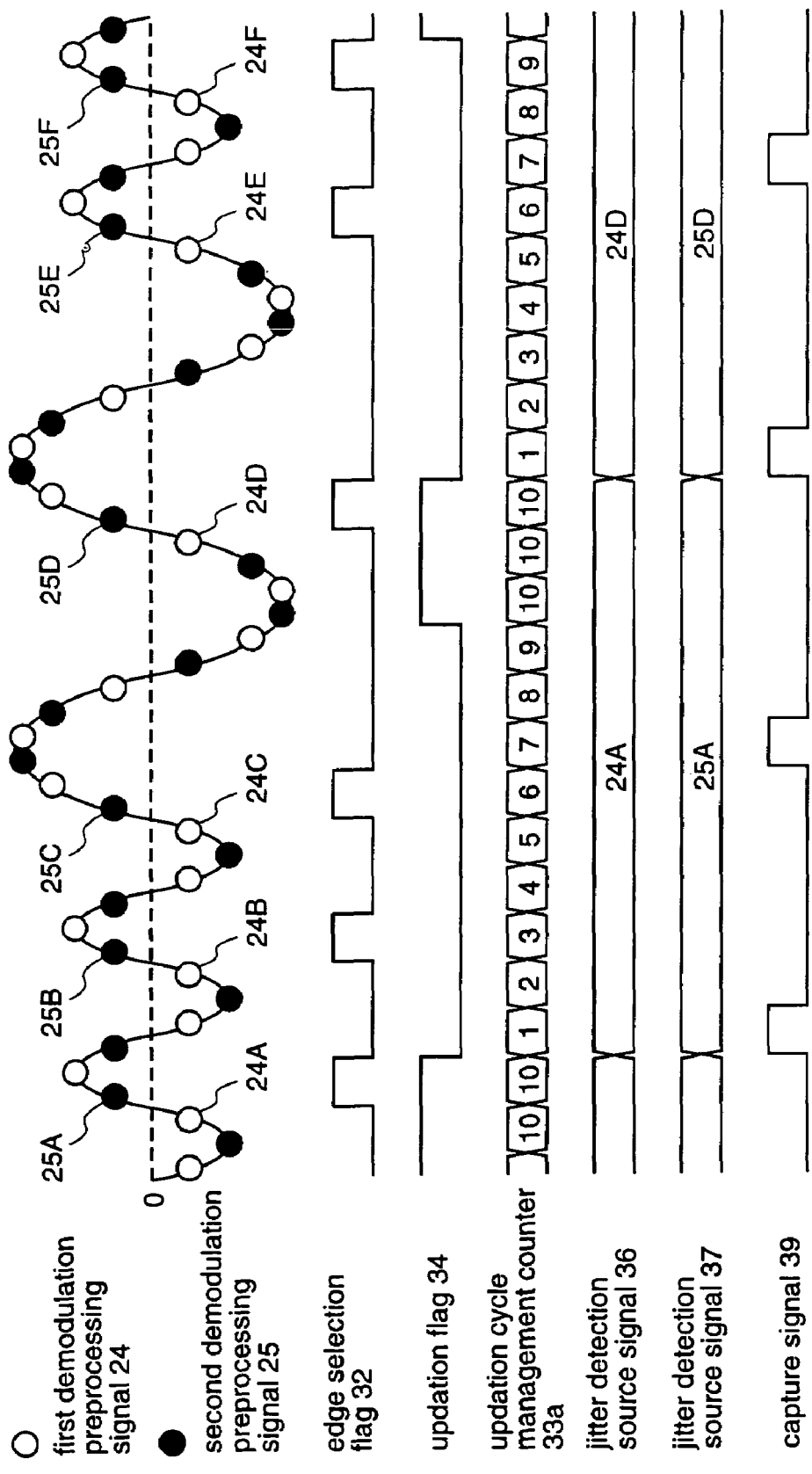

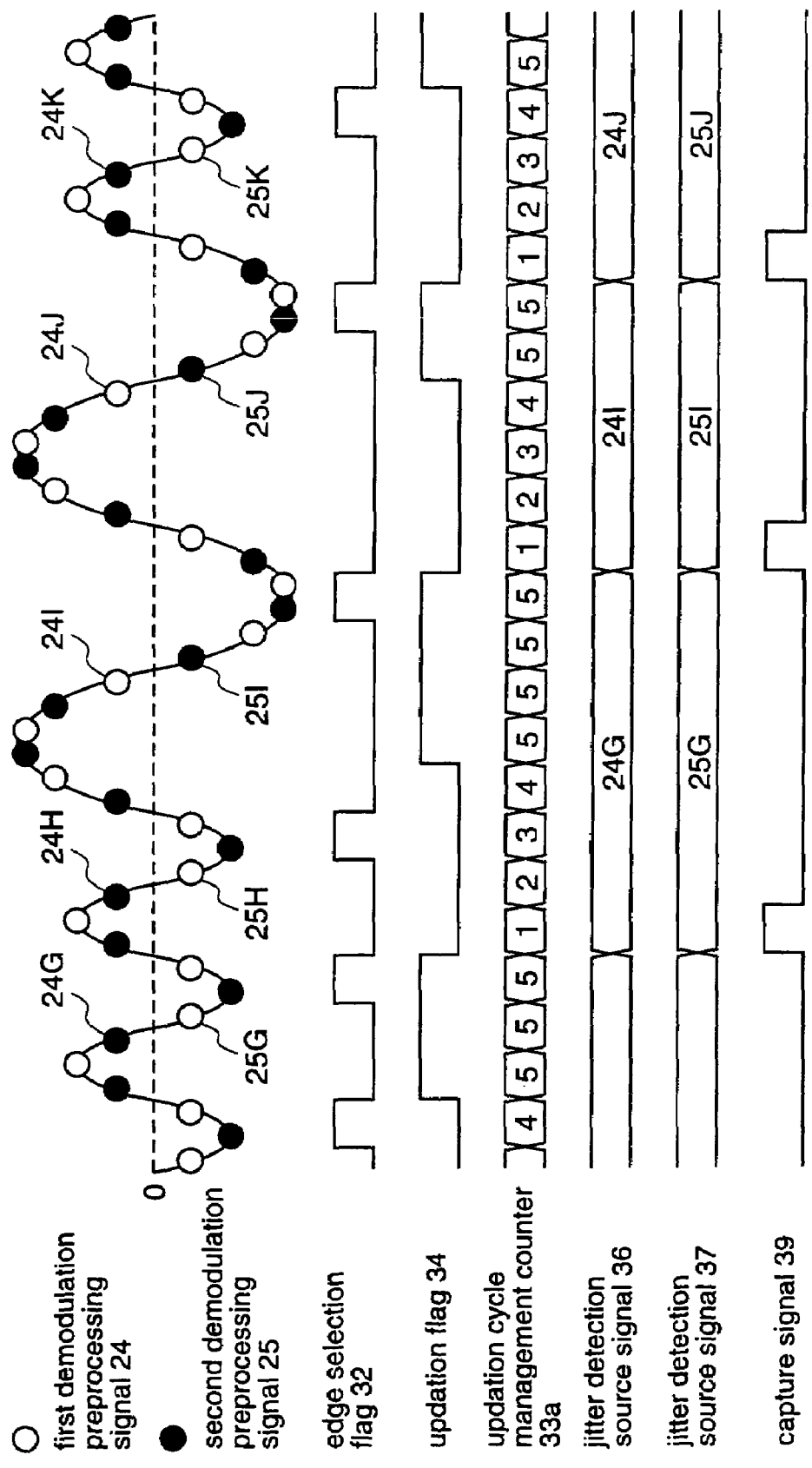

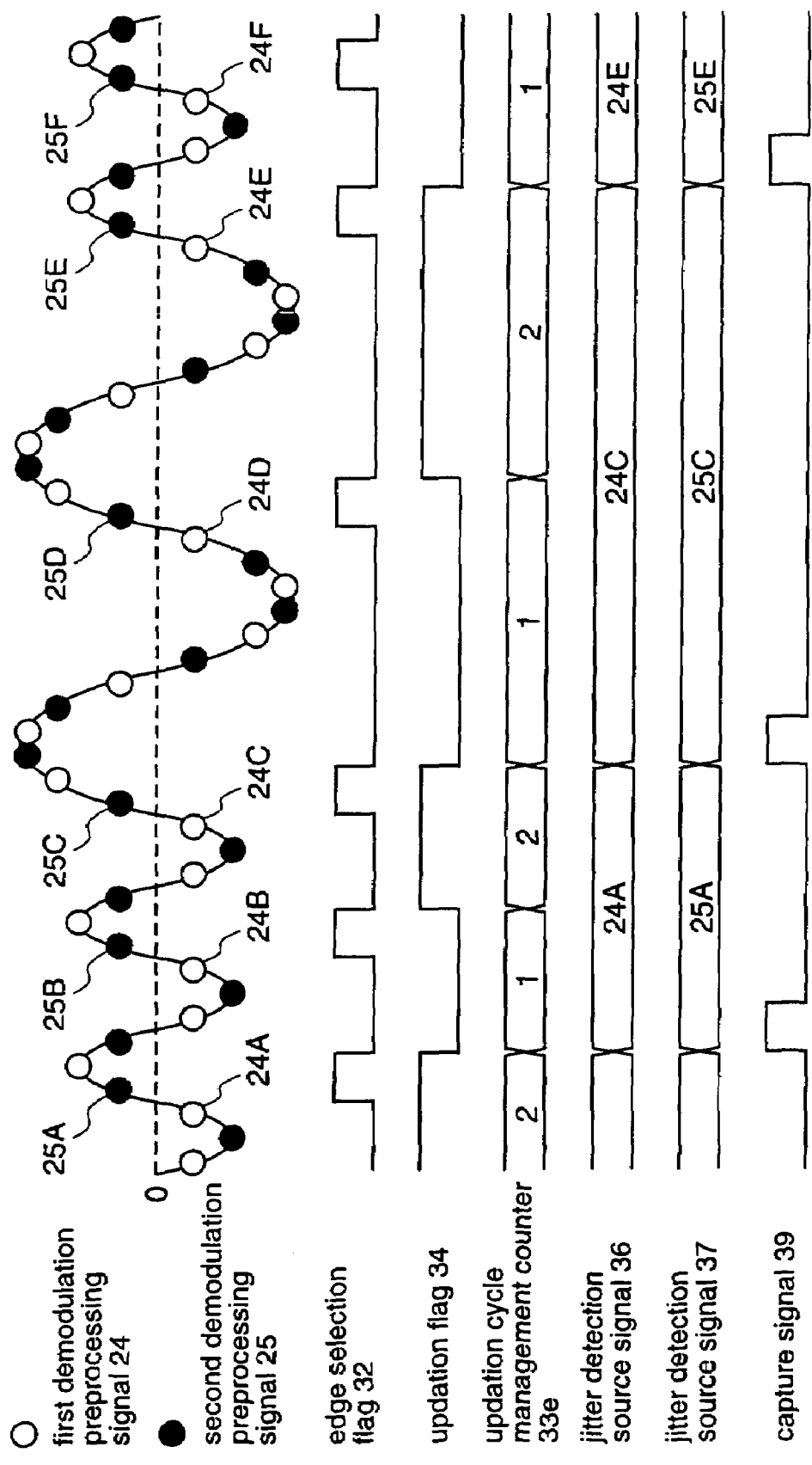

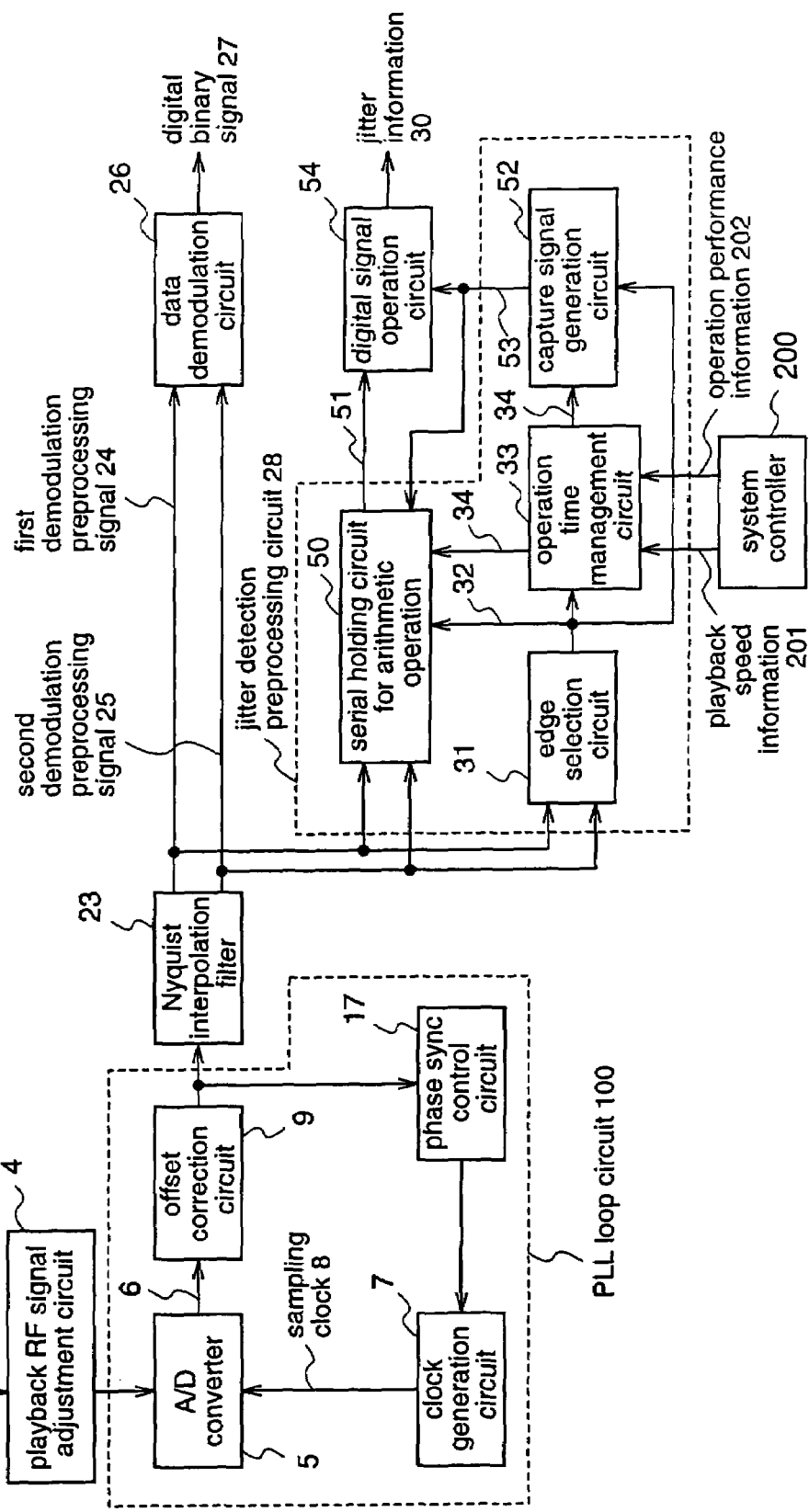

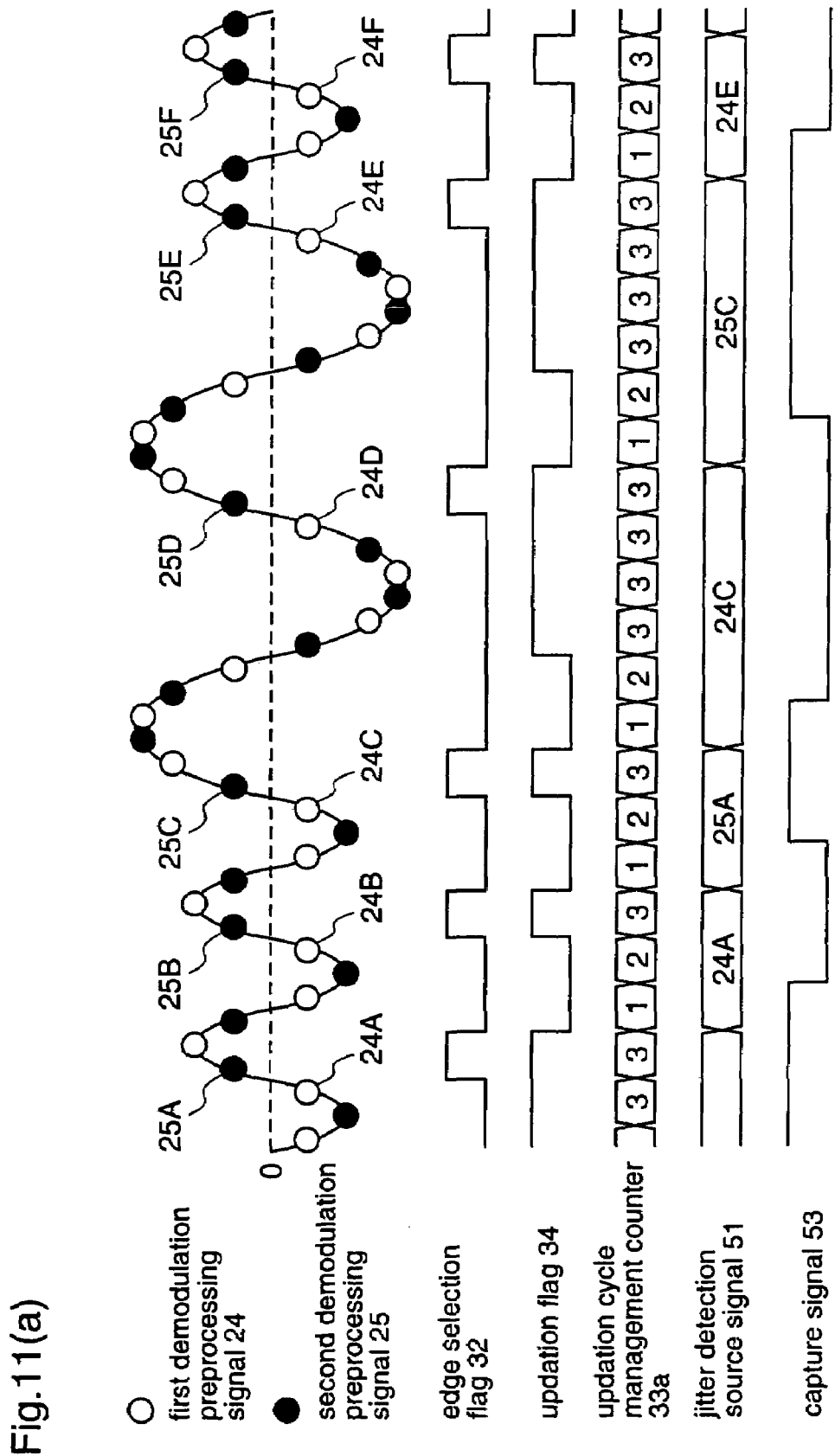

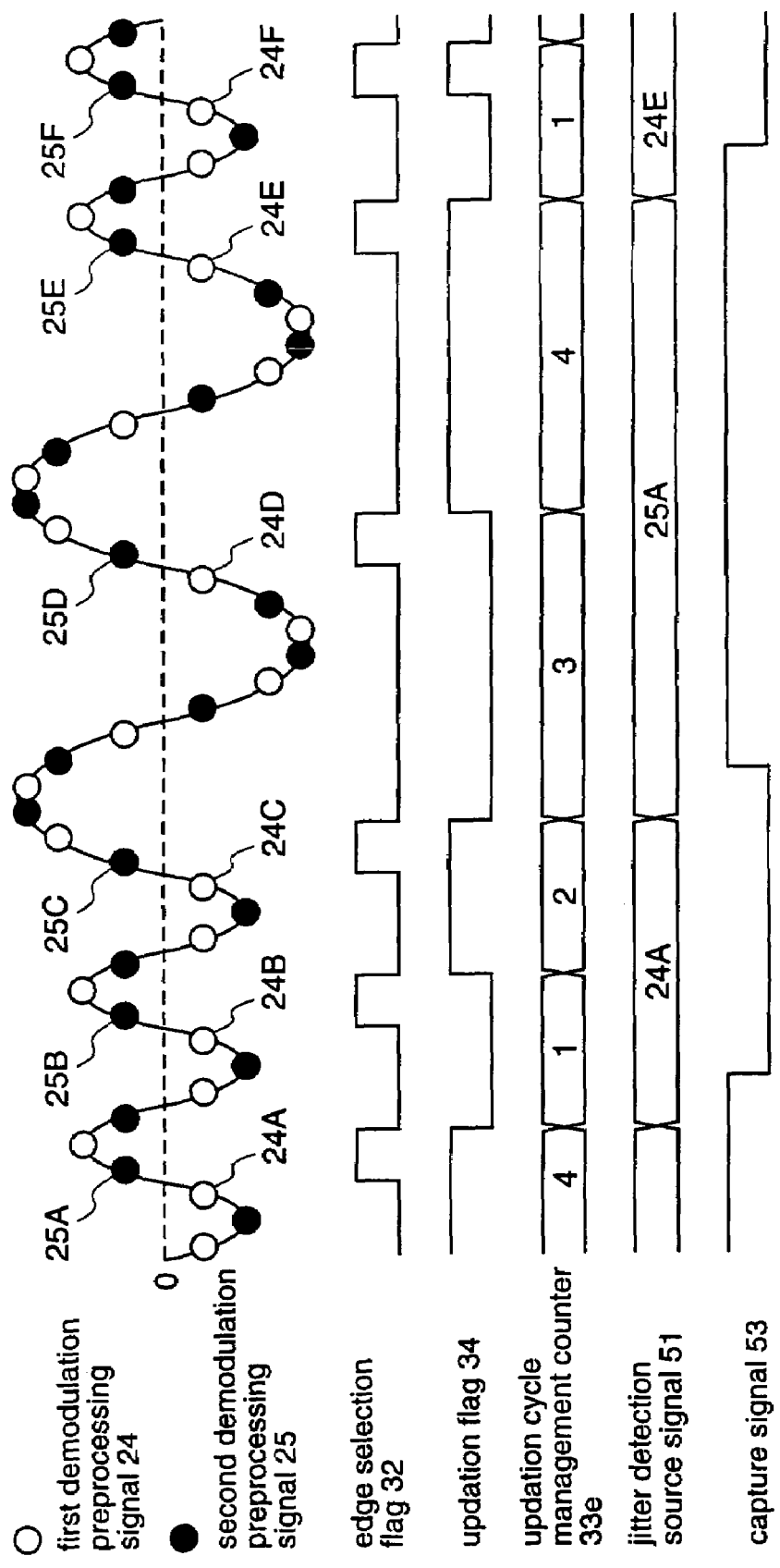

JITTER DETECTION APPARATUS

FIELD OF THE INVENTION

The present invention relates to a jitter detection apparatus that is applied to an optical disc device for reproducing digital data from an optical recording medium. More particularly, the invention relates to an improvement in a read channel technique for demodulating a digital binary signal from a playback RF signal.

BACKGROUND OF THE INVENTION

As a method for recording digital data on optical disk media, there has commonly been employed a method of uniformizing the recording density on a recording medium by making the linear velocity constant, as seen in a compact disk (hereinafter referred to as a CD), a DVD (Digital Versatile Disk), and a DVD-RAM (Digital Versatile Disk-Random Access Memory). When reproducing a digital binary signal from a playback RF (Radio Frequency) signal which is digitally recorded by performing mark width modulation so as to make the linear recording density constant, it is necessary to accurately extract jitter information in order to improve playback performance by optimized playback path.

In recent years, application of a PRML (Partial Response Maximum Likelihood) signal processing technique has been increasing for improvement in playback quality. In this case, a phase of a clock component corresponding to a channel bit frequency possessed by a playback RF signal must be detected from a signal in which an offset component in an amplitude direction is corrected, thereby to realize phase sync pull-in for synchronization of a sampling signal. In this case, it is necessary to extract jitter information from an amplitude component possessed by the sampling signal.

Hereinafter a description will be given of a method for performing detection of a digital binary signal and extraction of jitter information, using a signal synchronized with the phase of the clock component corresponding to the channel bit frequency of the playback RF signal.

With reference to FIG. 15, a playback RF signal 3 that is reproduced from an optical disc medium 1 by a playback signal detection circuit 2 is input to a waveform equalizer 57. The waveform equalizer 57 subjects the input signal to a correction that emphasizes a high-frequency band while emphasizing an output signal, and removes noise components that exist in frequency bands other than a demodulation signal, thereby improving jitters included in the playback RF signal. An analog-to-digital converter (hereinafter referred to as an A/D converter) 5 for converting an analog signal into a digital signal samples the output signal of the waveform equalizer 57 to obtain a multiple-bit digital RF signal 6. The A/D converter 5 employs, as its clock signal, a sampling clock 58 having a channel bit frequency component, which is generated by a voltage-controlled oscillator (hereinafter referred to as a VCO) 63. The channel bit frequency component is a frequency component corresponding to one bit of NRZI (Non Return to Zero Invert) codes which are actually recorded on the optical disc medium, and one channel bit corresponds to "1" or "0" of digital data.

The multiple-bit digital RF signal 6 which is sampled by the A/D converter 5 is input to a band limiting circuit 59, whereby unnecessary low-frequency components included in the digital RF signal 6 are removed. An output signal of the band limiting circuit 59 is output to a phase comparison processing block 60 and to a digital filter 64.

The phase comparison processing block 60 detects a phase error on the basis of the signal inputted to the block 60, and outputs the detected phase error signal to a low-pass filter (hereinafter referred to as a LPF) so as to synchronize the phase components of the digital RF signal 6 and the sampling clock 58. The phase error signal is filtered by the LPF 61, and thereafter, converted into an analog control quantity by a D/A converter 62 for converting a digital signal into an analog signal. The VCO 63 is driven on the basis of the analog control quantity to generate a sampling clock 58. Generation of a sampling clock 58 synchronized with the clock component of the playback RF signal 3 as well as generation of a digital RF signal 6 can be carried out by a feedback loop comprising the A/D converted output of the A/D converter 5→the band limiting circuit 59→a phase comparison processing block 60→the LPF 61→the D/A converter 62 the VCO 63→the sampling clock input of the A/D converter 5.

On the other hand, the digital filter 64 performs waveform equalization so as to output a signal that is obtained by performing a predetermined partial response equalization (PR equalization) for the output signal from the band limiting circuit 59. The equalized output from the digital filter 64 is decoded by a Viterbi decoder 65, thereby generating a maximum likelihood digital binary signal 27.

On the other hand, an absolute value of the phase error and polarity judgement information 67, which are outputted from the phase comparison processing block 60, are input to a jitter detection processing block 68. The jitter detection processing block 68 generates jitter information 69 on the basis of the inputted phase error absolute value 66 and the polarity judgement information 67 (for example, refer to Japanese Published Patent Application No. 2001-250341 (Pages 7~10, FIGS. 2~6)) It is possible to improve the playback quality from the optical recording medium by the demodulation of the digital binary signal based on the digital signal processing synchronized with the playback RF signal clock component, and the extraction of the jitter information obtained from the amplitude component.

In the conventional construction mentioned above, however, since a digital division circuit for performing jitter detection operation in the jitter detection processing block 68 is needed to perform high-speed operation, there occurs a limitation on the playback speed at which jitter information can be detected. Further, in order to increase the playback speed, the scale and power consumption of the circuit for extracting jitter information should be increased. On the other hand, there is a playback signal processing method which performs sampling with a cycle twice as long as the channel bit rate, as a method that is effective to reductions in the circuit scale and the power consumption during high-speed playback. However, the conventional construction cannot be applied as it is, to this method.

Furthermore, there may be cases where jitter information cannot be extracted during high-speed playback. Even if jitter information is extracted, there is a risk of degradation in the accuracy of the jitter information. Accordingly, adjustment for performing optimization based on the jitter information becomes insufficient, leading to a high possibility of degradation in playback performance.

SUMMARY OF THE INVENTION

The present invention is made to solve the above-described problems and has for its object to provide a jitter detection apparatus which can realize cost reduction due to low-speed operation of a division circuit that performs jitter detection operation and softwarization of the division circuit, and which can extract accurate jitter information, in a playback signal processing method in which sampling is carried out with a cycle twice as long as a channel bit rate during high-speed playback.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a jitter detection apparatus for detecting jitters which occur when playing an optical recording medium on which digital data are recorded using recording codes having a restriction that at least three same codes should be continued, comprising: a playback signal detection circuit for detecting a playback RF (Radio Frequency) signal from the optical recording medium; a PLL loop circuit for sampling the playback RF signal with a sampling clock that is synchronized with a cycle twice as long as a clock component included in the playback RF signal to output a digital RF signal after removal of an offset in an amplitude direction; a Nyquist interpolation filter for receiving, as an input signal, the offset-removed digital RF signal, and generating a first demodulation preprocessing signal for delaying the input signal by a predetermined period of time, and a second demodulation preprocessing signal which is a missing component in a time direction; a jitter detection preprocessing circuit for thinning out the first and second demodulation preprocessing signals at predetermined intervals according to the playback speed of the optical recording medium, in positions where the first demodulation preprocessing signal and the second demodulation preprocessing signal have opposite polarities, thereby extracting a capture signal which indicates a jitter detection source signal from which jitter information is to be extracted, and a hold timing of the jitter detection source signal, and outputting the capture signal; and a digital signal operation circuit for holding the jitter detection source signal at the hold timing indicated by the capture signal, and extracting jitter information from the jitter detection source signal.

In the jitter detection apparatus according to the first aspect, since the first and second demodulation preprocessing signals are thinned out according to the playback speed of the optical recording medium, the arithmetic processing by the digital signal operation circuit is prevented from being broken down in the case where the playback speed of the optical recording medium is high and the code pattern corresponds to the radio frequency wave, whereby accurate jitter information can be detected without the necessity of increasing the processing power of the digital signal operation circuit.

According to a second aspect of the present invention, the jitter detection apparatus according to the first aspect further includes a playback RF signal adjustment circuit for performing adjustment of amplitude of the playback RF signal as well as jitter adjustment, which is disposed between the playback signal detection circuit and the PLL loop circuit.

In the jitter detection apparatus according to the second aspect, since the playback RF signal adjustment circuit that performs adjustment of the amplitude of the playback RF signal and adjustment of jitters is disposed between the playback signal detection circuit and the PLL loop circuit, it is possible to realize a jitter detection apparatus having higher jitter detection performance.

According to a third aspect of the present invention, in the jitter detection apparatus according to the second aspect, the PLL loop circuit includes a clock generation circuit for generating a sampling clock that is synchronized with a cycle twice as long as a clock component included in the playback RF signal; an analog-to-digital converter (hereinafter referred to as an A/D converter) for generating a digital RF signal by sampling an output signal of the playback RF signal adjustment circuit with the sampling clock; an offset correction circuit for correcting an offset component in the amplitude direction of the digital RF signal; and a phase sync control circuit for extracting phase error information from an output signal of the offset correction circuit, and performing phase sync control of the sampling clock generated by the clock generation circuit so as to bring the phase error information close to zero.

In the jitter detection apparatus according to the third aspect, since the PLL loop circuit is provided with the clock generation circuit, the A/D converter, the offset correction circuit, and the phase sync control circuit, it is possible to realize a jitter detection apparatus which can extract accurate jitter information.

According to a fourth aspect of the present invention, in the jitter detection apparatus according to the first aspect, the jitter detection preprocessing circuit includes an edge selection circuit for selecting either a rising edge or a falling edge in a position where the first demodulation preprocessing circuit and the second demodulation preprocessing circuit have opposite polarities; an operation time management circuit for calculating an operation time that is required for extraction of jitter information by the digital signal operation circuit, in accordance with a pattern length of recorded codes which is selected by the edge selection circuit as well as the playback speed of the optical recording medium, and outputting an updation flag; a holding circuit for arithmetic operation, which holds the first and second demodulation preprocessing signals in parallel with each other as the jitter detection source signal, in a position where the first demodulation preprocessing signal and the second demodulation preprocessing signal have opposite polarities, and outputs the jitter detection source signal; and a capture signal generation circuit for generating a capture signal by delaying the hold timing of the holding circuit for arithmetic operation.

In the jitter detection apparatus according to the fourth aspect, since the jitter detection preprocessing circuit is constituted so as to include the edge selection circuit, the operation time management circuit, the holding circuit for arithmetic operation, and the capture signal generation circuit, it is possible to realize a jitter detection apparatus which can extract accurate jitter information.

According to a fifth aspect of the present invention, in the jitter detection apparatus according to the fourth aspect, the operation time management circuit generates an updation flag only one time for every N (N: positive integer) pieces of output signals from the edge selection circuit, in accordance with the playback speed of the optical recording medium.

In the jitter detection apparatus according to the fifth aspect, since the operation time management circuit is constituted so as to generate an updation flag only one time for every N (N: positive integer) pieces of output signals from the edge selection circuit in accordance with the playback speed of the optical recording medium, it is possible to realize a jitter detection apparatus which can extract accurate jitter information.

According to a sixth aspect of the present invention, in the jitter detection apparatus according to the fifth aspect, the operation time management circuit shortens the updation flag generation cycle when the playback speed of the optical recording medium is low, and lengthens the updation flag generation cycle when the playback speed is high.

In the jitter detection apparatus according to the sixth aspect, since the operation time management circuit is constituted so that the updation flag generation cycle is shortened when the playback speed of the optical recording medium is low while it is lengthened when the playback speed is high, it is possible to realize a jitter detection apparatus which can extract accurate jitter information.

According to a seventh aspect of the present invention, in the jitter detection apparatus according to the first aspect, the digital signal operation circuit includes first and second jitter source signal holding circuits for holding the jitter detection source signal at the hold timing of the capture signal; an averaging circuit for averaging output signals of the first and second jitter source holding circuits; a subtraction circuit for calculating a difference between the output signal of the first jitter source signal holding circuit and the output signal of the second jitter source signal holding circuit; a division circuit for dividing the output signal of the averaging circuit by the output signal of the subtraction circuit; and a jitter operation circuit for squaring the output signal of the division circuit, and adding the resultant signal by M times (M: integer not less than 2) with the cycle of the capture signal and averaging the signal, and then raising the signal to the power of ½, thereby detecting the jitter information.

In the jitter detection apparatus according to the seventh aspect, since the digital signal operation circuit is constituted so as to have the first and second jitter source signal holding circuits, the averaging circuit, the subtraction circuit, the division circuit, and the jitter operation circuit, it is possible to realize a jitter detection apparatus which can extract accurate jitter information.

According to an eighth aspect of the present invention, in the jitter detection apparatus according to the first aspect, the jitter detection preprocessing circuit includes an edge selection circuit for selecting either a rising edge or a falling edge in a position where the first demodulation preprocessing circuit and the second demodulation preprocessing circuit have opposite polarities; an operation time management circuit for calculating an operation time that is required for extraction of jitter information by the digital signal operation circuit, in accordance with a pattern length of recorded codes which is selected by the edge selection circuit as well as the playback speed of the optical recording medium, and outputting an updation flag; a serial holding circuit for arithmetic operation, which holds, as the jitter detection source signal, the first demodulation preprocessing signal and the second demodulation preprocessing signal having opposite polarities in a position where the updation flag outputted from the operation time management circuit matches the output signal of the edge selection circuit, in series with a time axis, and outputs the jitter detection source signal; and a capture signal generation circuit for generating a capture signal by delaying the hold timing of the serial holding circuit for arithmetic operation.

In the jitter detection apparatus according to the eighth aspect, since the jitter detection preprocessing circuit is provided with the edge selection circuit, the operation time management circuit, the serial holding circuit for arithmetic operation, and the capture signal generation circuit, the arithmetic processing by the digital signal operation circuit is prevented from being broken down in a case where the playback speed of the optical recording medium is high and the code pattern corresponds to the radio frequency wave, whereby accurate jitter information can be detected without the necessity of increasing the processing power of the digital signal operation circuit. Further, since signals can be serially transferred between the serial holding circuit for arithmetic operation and the digital signal operation circuit, the interfaces between these circuits can be simplified.

According to a ninth aspect of the present invention, in the jitter detection apparatus according to the eighth aspect, the operation time management circuit generates an updation flag only one time for every 2×L (L: positive integer) pieces of output signals from the edge selection circuit, in accordance with the playback speed of the optical recording medium.

In the jitter detection apparatus according to the ninth aspect, since the operation time management circuit is constructed so as to generate an updation flag only one time for every 2×L (L: positive integer) pieces of output signals from the edge selection circuit in accordance with the playback speed of the optical recording medium, it is possible to realize a jitter detection apparatus which can extract accurate jitter information.

According to a tenth aspect of the present invention, in the jitter detection apparatus according to the ninth aspect, the operation time management circuit shortens the updation flag generation cycle when the playback speed of the optical recording medium is low, and lengthens the updation flag generation cycle when the playback speed is high.

In the jitter detection apparatus according to the tenth aspect, since the operation time management circuit is constructed so that the updation flag generation cycle is shortened when the playback speed of the optical recording medium is low while it is lengthened when the playback speed is high, it is possible to realize a jitter detection apparatus that can extract accurate jitter information.

According to an eleventh aspect of the present invention, in the jitter detection apparatus according to the eighth aspect, the digital signal operation circuit includes a timing detection circuit for determining a capture reference timing from the polarity of the capture signal and the polarity of the jitter detection source signal; a first jitter source signal holding circuit for holding the jitter detection source signal by the capture signal, with reference to the output signal of the timing detection circuit; a second jitter source signal holding circuit for holding the jitter detection source signal by the capture signal in a position where the polarity of the capture signal is inverted; an averaging circuit for averaging the output signal of the first jitter source signal holding circuit and the output signal of the second jitter source signal holding circuit; a subtraction circuit for calculating a difference between the output signal of the first jitter source signal holding circuit and the output signal of the second jitter source signal holding circuit; a division circuit for dividing the output signal of the averaging circuit by the output signal of the subtraction circuit; and a jitter operation circuit for squaring the output signal of the division circuit, and adding the resultant signal by M times (M: integer not less than 2) with the cycle of the capture signal and averaging the signal, and then raising the signal to the power of ½, thereby detecting the jitter information.

In the jitter detection apparatus according to the eleventh aspect, since the digital signal operation circuit is provided with the timing detection circuit, the first jitter source signal holding circuit, the second jitter source signal holding circuit, the averaging circuit, the subtraction circuit, the division circuit, and the jitter operation circuit, it is possible to realize a jitter detection apparatus which can extract accurate jitter information.

As described above, the jitter detection apparatus according to the present invention is provided with the Nyquist interpolation filter for demodulating missing time components; the digital signal operation circuit for extracting jitter information from a jitter detection source signal; and the function of controlling the output rate of the jitter detection source signal, according to the playback speed of the optical recording medium and the pattern length of recorded codes, considering the performance of the digital signal operation circuit. Therefore, extraction of accurate jitter information can be carried out in the playback signal processing system which performs sampling with a cycle twice as long as the channel bit rate during high-speed playback.

Further, according to the jitter detection apparatus of the present invention, since detection of jitter which serves as an indicator for playback signal quality can be carried out accurately even during high-speed playback, it is possible to accurately perform adjustment for the cutoff frequency and boost learning of an analog equalizer to improve jitters of the playback RF signal, and adjustment for the best point in balance learning in focus servo relating to the performance of the playback RF signal, whereby the playback signal quality is improved even during high-speed playback.

Furthermore, according to the jitter detection apparatus of the present invention, since extraction of accurate jitter information is realized and thereby a detection system can be constituted in a large-scale integrated circuit, the recording quality of digital data recorded on the optical recording medium 1 can be easily checked. Further, the obtained jitter information can also serve as an indicator for improvement in the quality of the recorded data. Further, processing such as screening of defectives in optical disc devices during fabrication is also simplified.

BRIEF DESCRIPTION OF THE DRAWINGS

FIG. 6(e) is a diagram for explaining the operation principle of a jitter detection preprocessing circuit for low-speed playback according to the first embodiment, when the jitter detection preprocessing circuit selects rising edges.

FIG. 6(f) is a diagram for explaining the operation principle of the jitter detection preprocessing circuit for high-speed playback according to the first embodiment when the jitter detection preprocessing circuit selects rising edges.

FIG. 6(g) is a diagram for explaining the operation principle of the jitter detection preprocessing circuit according to the first embodiment when the jitter detection preprocessing circuit selects falling edges.

FIG. 7(b) is a diagram for explaining the operation principle of the jitter detection preprocessing circuit according to the first embodiment when the jitter detection preprocessing circuit select rising edges.

FIG. 10 is a block diagram illustrating the construction of an optical disc device according to a second embodiment of the present invention.

FIG. 11(a) is a diagram for explaining the operation principle of a jitter detection preprocessing circuit according to the second embodiment when the jitter detection preprocessing circuit selects rising edges.

FIG. 11(b) is a diagram for explaining the operation principle of the jitter detection preprocessing circuit according to the second embodiment when the jitter detection preprocessing circuit selects rising edges.

DETAILED DESCRIPTION OF THE PREFERRED EMBODIMENTS

Hereinafter, embodiments of the present invention will be described with reference to the drawings.

Embodiment 1

Figure 1:
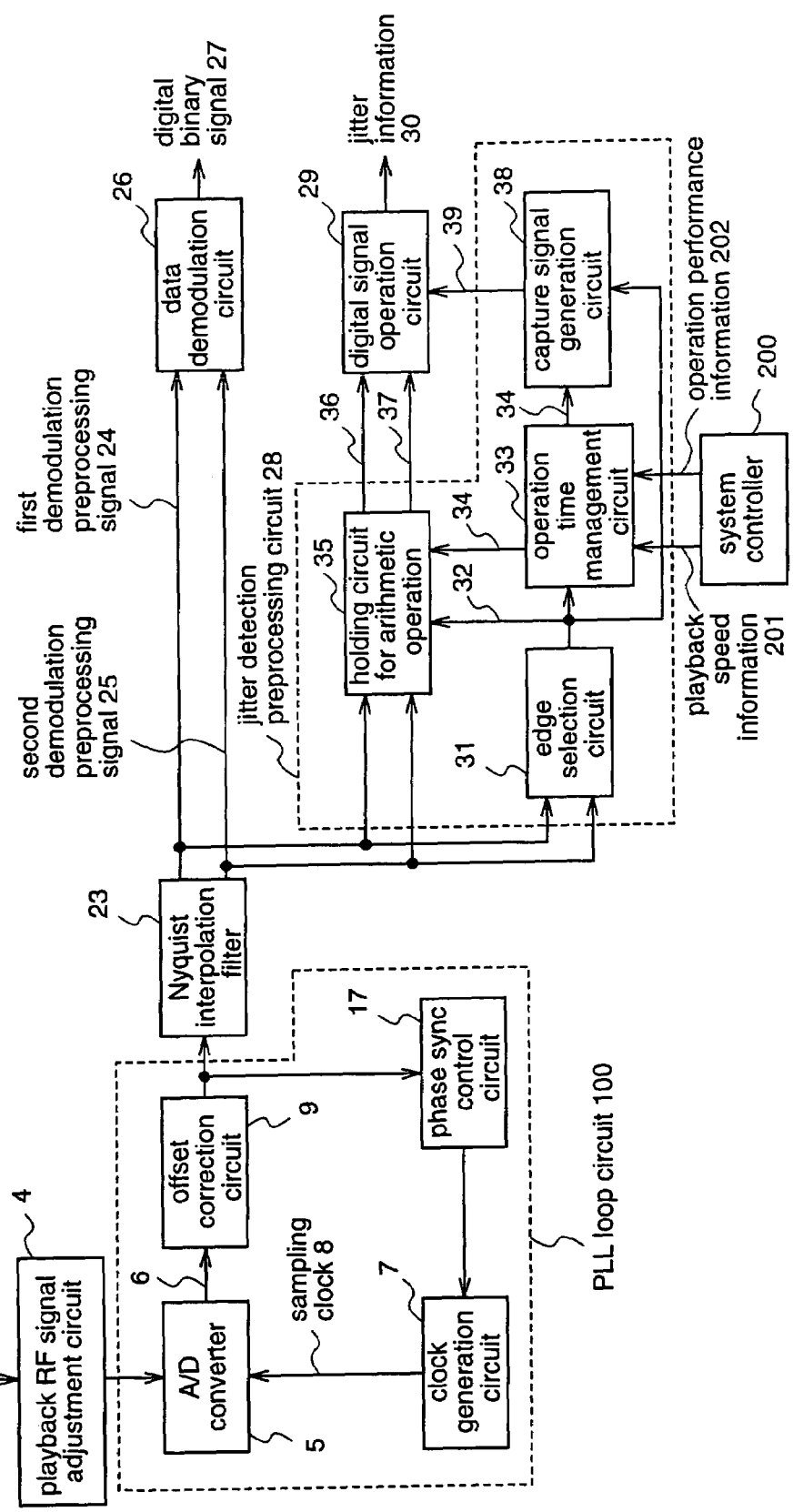
FIG. 1 is a block diagram illustrating the construction of an optical disc device having a jitter detection apparatus according to a first embodiment of the present invention.

FIG. 1 is a block diagram illustrating the construction of an optical disc device including a jitter detection apparatus according to a first embodiment of the present invention.

This first embodiment is provided with a Nyquist interpolation filter for demodulating missing time components, a digital signal operation circuit, and a function of controlling an output rate of a jitter detection source signal according to a playback speed and a pattern length of recorded codes, considering performance of the digital signal operation circuit, whereby extraction of accurate jitter information can be realized in a playback signal processing method in which sampling is carried out with a cycle twice as long as a channel bit rate during high-speed playback.

In FIG. 1, the optical disc device according to the first embodiment comprises a playback signal detection circuit 2, a playback RF signal adjustment circuit 4, a PLL loop circuit 100, a Nyquist interpolation filter 23, a data demodulation circuit 26, a jitter detection preprocessing circuit 28, a digital signal operation circuit 29, and a system controller 200.

The PLL loop circuit 100 comprises an A/D converter 5, an offset correction circuit 9, a phase sync control circuit 17, and a clock generation circuit 7.

Further, the jitter detection preprocessing circuit 28 comprises an edge selection circuit 31, an operation time management circuit 33, a holding circuit 35 for arithmetic operation, and a capture signal generation circuit 38.

Figure 2:
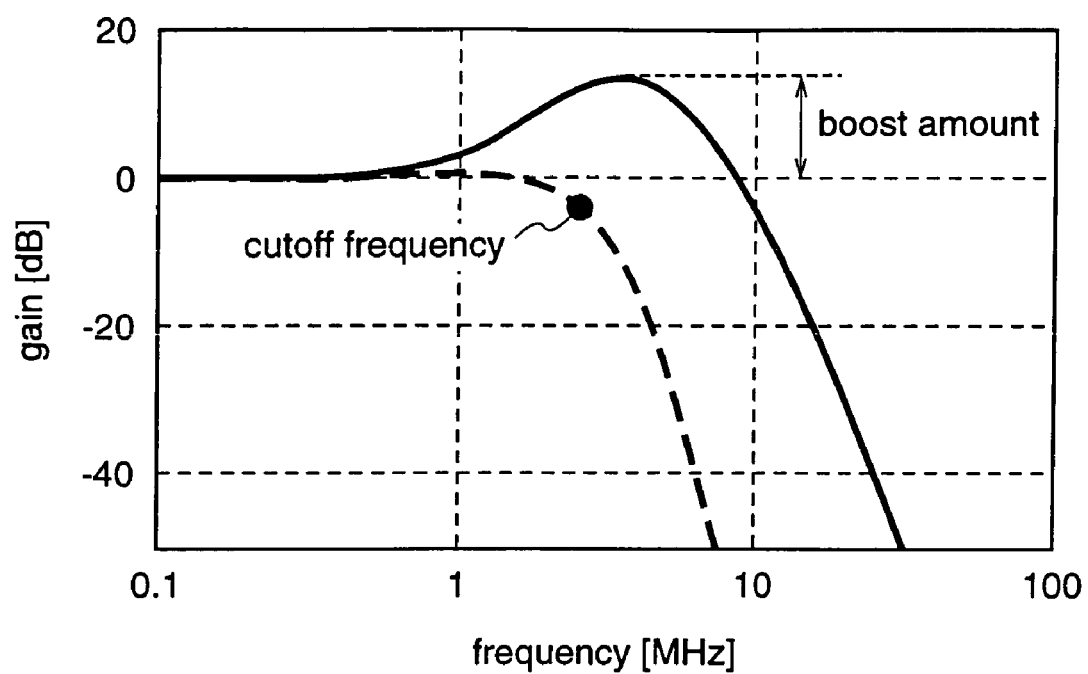
FIG. 2 is a diagram for explaining frequency characteristics of a high-order equal ripple filter.

In the optical disc device according to the first embodiment, a playback RF signal 3 that is reproduced by the playback signal detection circuit 2 from the optical disc medium (optical recording medium) 1 on which data are recorded is subjected to correction such that a high-frequency band thereof is emphasized while emphasizing an output signal by the playback RF signal adjustment circuit 4, and noise components existing in frequency bands other than a demodulated signal are removed, thereby improving jitters. The playback RF signal adjustment circuit 4 comprises a filter that can arbitrarily set a boost quantity and a cut-off frequency. This filter may be such as a high-order equal ripple filter having frequency characteristics as shown by a solid line in FIG. 2. In FIG. 2, a dotted line shows characteristics in the case where high-frequency boosting is not carried out.

The A/D converter 5 converts an analog signal into a digital signal using a sampling clock 8 generated by the clock generation circuit 7. The A/D converter 5 samples an output signal of the playback RF signal adjustment circuit 4 into a multiple-bit digital RF signal 6. At this time, when codes of a digital binary signal 27 to be demodulated are recording codes having such a restriction that at least three pieces of identical codes should be continued, like 8-16 modulation codes used for a DVD (i.e., codes in which the minimum run-length is restricted by 2) and signal components are distributed in a frequency band that is about ¼ or lower than the channel bit frequency, it is theoretically possible to demodulate the digital binary signal 27 in the case where it is sampled by the A/D converter 5 using the sampling clock 8 having a frequency component that is half the channel bit frequency, according to sampling theorem.

When performing sampling using the sampling clock 8 having a frequency component that is half the channel bit frequency, i.e., the sampling clock having a cycle twice as long as the channel bit rate, it is possible to achieve, particularly, cost reduction of the optical disc device by reduction in power consumption during high-speed playback as well as reduction in circuit scale.

The sampled multiple-bit digital RF signal 6 is input to the offset correction circuit 9, whereby an offset component in the amplitude direction, which is included in the digital RF signal 6, is corrected. This offset correction circuit 9 corresponds to the band restriction circuit 59 of the conventional apparatus.

Hereinafter, the circuit construction and operation principle of the offset correction circuit 9 will be described in detail, with reference to FIGS. 3(a) and 3(b). The circuit shown in FIG. 3(a) is merely an example, and the offset correction circuit 9 of the present invention is not restricted to the circuit construction shown in FIG. 3(a).

Figure 3A:
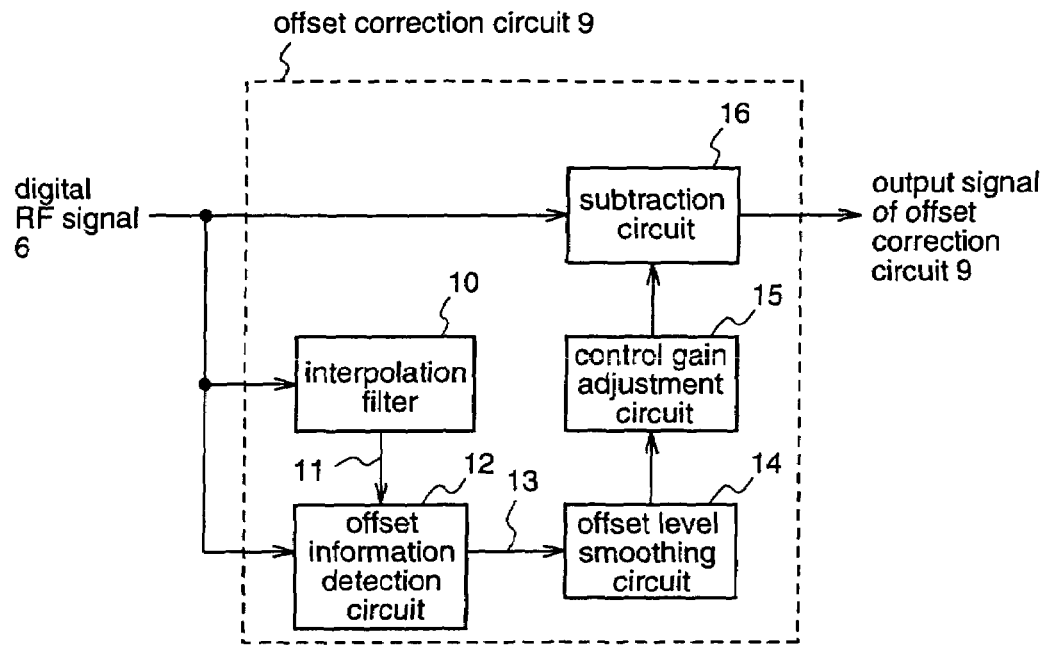
FIG. 3(a) is a block diagram illustrating the construction of an offset correction circuit according to the first embodiment.
Figure 3B:
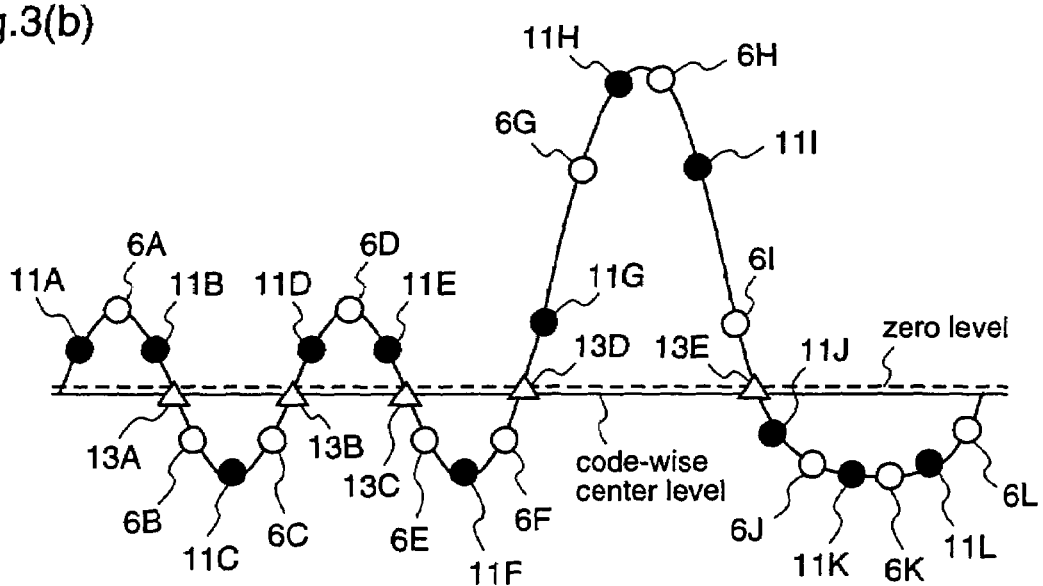
FIG. 3(b) is a diagram for explaining the operation principle of the offset correction circuit according to the first embodiment.

FIG. 3(a) is a block diagram illustrating the construction of the offset correction circuit 9, and FIG. 3(b) is a diagram for explaining the operation principle of the offset correction circuit 9.

In FIGS. 3(a) and 3(b), interpolation signals 11 (11A~11L shown by "●" in FIG. 3(b)) as missing component information in the time direction when based on the channel bit rate are restored by restoring the Nyquist bands in the digital RF signals 6 as input signals, using an interpolation filter 10, from the digital RF signals 6 (6A~6L shown by "○" in FIG. 3(b)) which are sampled by the sampling clock 8 generated with reference to a frequency that is half the channel bit frequency.

Figure 4:
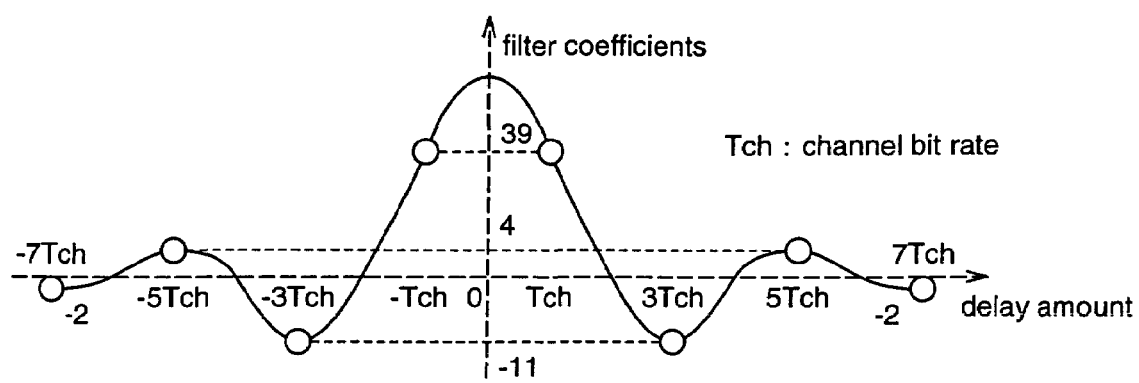
FIG. 4 is a diagram for explaining Nyquist characteristics.

The interpolation filter 10 is constituted by a finite impulse response filter having filter coefficients for restoring the Nyquist bands, as shown in FIG. 4. In FIG. 4, Tch indicates the channel bit rate, and the ordinate indicates filter coefficients of the finite impulse response filter. The longer the finite length is, the higher the accuracy of Nyquist interpolation is. It is also possible to reduce the circuit scale by alleviating influence of an abandoning operation error of a finite tap, using window coefficients of a humming window or the like. The filter construction and the filter coefficients according to the first embodiment are merely examples, and the interpolation filter 10 of the present invention is not restricted thereto.

Figure 5A:
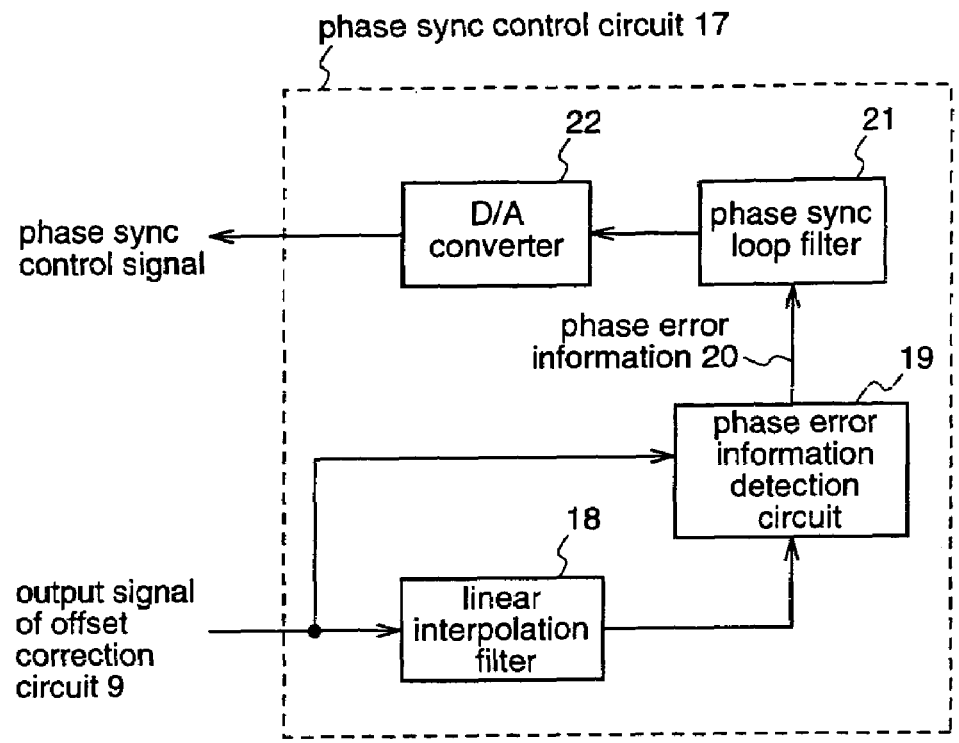
FIG. 5(a) is a block diagram illustrating the construction of a phase sync control circuit according to the first embodiment.
Figure 5B:
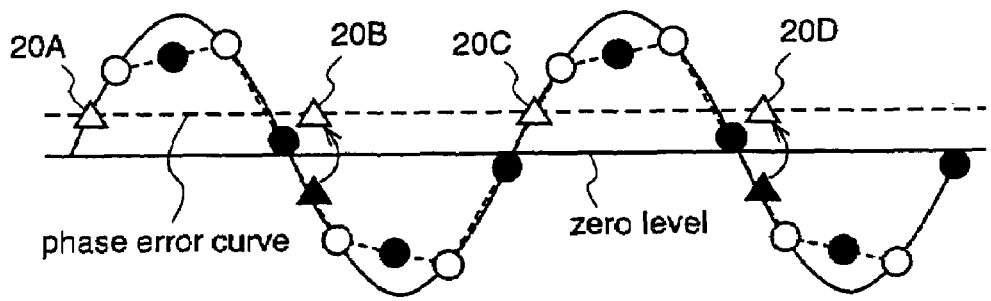
FIG. 5(b) is a diagram for explaining the detection principle of phase error information according to the first embodiment.

For example, a zerocross position in which signals have opposite signs (polarities) across the zero level as shown in FIG. 3(b) is detected using the digital RF signal 6 and the interpolation signal 11, by the offset information detection circuit 12 shown in FIG. 3(a), and offset information 13 (any of 13A~13E shown by "Δ" in FIG. 5(b)) in the zerocross position is detected. At this time, the operation principle of the offset information detection circuit 12 is based on that, for example, since the digital RF signal 6F and the interpolation signal 11G that appears next have opposite polarities of codes, it can be supposed that there exists a zerocross position between these signals 6F and 11G. In a position which is estimated to be a zerocross position, two signals sandwiching the zerocross position, e.g., the digital RF signal 6F and the interpolation signal 11G, are added and averaged, i.e., are subjected to linear interpolation, thereby generating offset information 13D. The offset information 13 is smoothed by an offset level smoothing circuit 14, and subjected to gain adjustment suited to response characteristics of the target of offset correction by the control gain adjustment circuit 15, and thereafter, the smoothed and gain-adjusted offset information is subtracted from the digital RF signal 6 by a subtraction circuit 16, thereby reducing the offset components in the amplitude direction, which are included in the digital RF signal 6.

As described above, the offset correction circuit 9 performs feedback control so that the offset components in the amplitude direction, which are included in the digital RF signal 6, are adjusted to the zero level.

On the other hand, when applying the digital signal processing method, in order to reduce power consumption especially during high-speed playback, it is necessary to generate, from the playback RF signal 3, a digital RF signal 6 synchronized with the phase of a frequency that is half the frequency of the clock component included in the playback RF signal 3. In order to realize this, using the phase sync control circuit 17, phase error information 20 shown in FIG. 5(a) is detected using an output signal that is generated through the A/D converter 5 and the offset correction circuit 9 as well as a signal that is obtained by restoring a signal which is missing in the time direction from the output signal by interpolation, and thereafter, the detected phase error information 20 is processed into a phase sync control signal to be used for performing phase sync control, and then the processed signal is input to the clock generation circuit 7, thereby performing control so that the phase of the sampling clock 8 is synchronized with the phase of the frequency that is half the frequency of the clock component included in the output signal of the playback RF signal adjustment circuit 4. The clock generation circuit 7 generates a sampling clock 8 according to the inputted voltage value, and it may be constructed by a voltage-controlled oscillator (hereinafter referred to as a VCO). Further, the phase sync control circuit 17 may be composed of a linear interpolation filter 18, a phase error information detection circuit 19, a phase sync loop filter 21, and a D/A converter 22. Thus, phase sync control is realized by performing a sequence of feedback circuit operations in the following order: the A/D conversion output from the A/D converter 5→the offset correction circuit 9→the phase sync control circuit 17→the clock generation circuit 7→the sampling clock input to the A/D converter 5.

Hereinafter, the circuit construction and operation principle of the phase sync control circuit 17 will be described in detail with reference to FIGS. 5(*a*) and 5(*b*). The circuit shown in FIG. 5(*a*) is merely an example, and the phase sync control circuit 17 of the present invention is not restricted thereto.

FIG. 5(*a*) is a block diagram illustrating the construction of the phase sync control circuit 17, and FIG. 5(*b*) is a diagram for explaining the principle of generating phase error information 20 in the phase sync control circuit 17.

With reference to FIGS. 5(*a*) and 5(*b*), the interpolation signals (shown by "●" in FIG. 5(*b*)) which are missing components in the time direction when based on the channel bit rate are restored from the output signals (shown by "○" in FIG. 5(*b*)) of the offset correction circuit 9 by using the linear interpolation filter 18 having a function of performing averaging between adjacent data. For example, the output signals from the offset correction circuit 9, which are adjacent to each other, are added and averaged, thereby generating an output signal of the linear interpolation filter 18. Next, zerocross positions in which signals have opposite signs (polarities) across the zero level as shown in FIG. 5(*b*) are detected, and further, phase error information 20 (20A~20D shown by "△" in FIG. 5(*b*)) at the zerocross positions are detected, by the phase error information detection circuit 19, using the output signal of the offset correction circuit 9 and the output signal of the linear interpolation filter 18. At this time, the operation principle of the phase error information detection circuit 19 is as follows. That is, the phase error information detection circuit 19 generates phase error information 20A and 20C by adding and averaging the output signal of the offset correction circuit 9 and the output signal of the vertical interpolation filter 18, with respect to the rising edges, in the positions which are estimated as the zerocross positions. On the other hand, with respect to the falling edges, the output signal of the offset correction circuit 9 and the output signal of the linear interpolation filter 18 are added and averaged to generate phase error information preprocessing signals shown by "▲" in FIG. 5(*b*), and the polarities thereof are inverted to generate phase error information 20B and 20D. In this way, the phase error curve obtained by connecting the phase error information 20A~20D shows the positive polarity with respect to the zero level, and thereby indicates that the phase is delayed. The phase sync loop filter 21 filters the detected phase error information 20, and outputs the filtered signal. The D/A converter 22 converts the output signal of the phase sync loop filter 21 into a phase sync control signal as an analog control signal. The phase sync loop filter 21 may be constituted so as to adjust the gains of the proportional component and the integral component, and add the components after the gain adjustment.

Next, the Nyquist interpolation filter 23 shown in FIG. 1 receives the output signal from the offset correction circuit 9, and restores the Nyquist band with an accuracy higher than that of the linear interpolation, thereby restoring a second demodulation preprocessing signal 25 which is a missing component in the time direction when based on the channel bit rate. At the same time, the Nyquist interpolation filter 23 delays the output signal of the offset correction circuit 9 by a time equivalent to the operation delay time of the second demodulation preprocessing signal 25, thereby generating a first demodulation preprocessing signal 24.

The Nyquist interpolation filter 23 comprises a finite impulse response filter having filter coefficients for restoring a Nyquist band as shown in FIG. 4, like the interpolation filter 10 shown in FIG. 3 (*a*). The filter structure and the filter coefficients shown in FIG. 4 are merely examples, and the Nyquist interpolation filter 23 of the present invention is not restricted thereto.

Next, the first demodulation preprocessing signal 24 and the second demodulation preprocessing signal 25 which are generated by the Nyquist interpolation filter 23 are alternately inputted to the data demodulation circuit 26, and are judged as to whether the polarity thereof is positive or negative with respect to the zero level. For example, the result of judgement is determined as "1" when the polarity is positive, while it is determined as "0" when the polarity is negative, thereby demodulating the digital binary signal 27. Further, not the zero level but an arbitrary threshold level may be used for the judgement. The demodulation method described above is merely an example, and the present invention is not restricted thereto.

It is desirable to extract jitter information, when the quality of the optical disc device is checked during fabrication of the device or when the quality of data recorded on the optical disc medium 1 is examined, or as indicators for balance adjustment of focus servo to improve the playback RF signal 3 or adjustment to improve the jitter of the playback RF signal 3 by optimizing the cutoff frequency and the boost amount of the equal ripple filter in the playback RF signal adjustment circuit 4. Particularly there are many kinds of media to be supported by the optical disc device, and therefore, recording/playback speed must be broadly ensured. From this point of view, if the jitter information 30 can be extracted with high accuracy independently of the media and the playback speed, the recording performance as well as the playback performance of the optical disc device can be further improved.

The first demodulation preprocessing signal 24 and the second demodulation preprocessing signal 25 which are generated by the Nyquist interpolation filter 23 are input to the jitter detection preprocessing circuit 28, and thereafter, converted into jitter detection source signals 36 and 37 and a capture signal 39. The jitter detection source signals 36 and 37 and the capture signal 39 are input to the digital signal operation circuit 29 having arithmetic elements such as a multiplication function and a division function, and thereafter, jitter information 30 is detected on the basis of these signals.

Hereinafter, a description will be given of the circuit construction of the jitter detection preprocessing circuit 28 and the generation principle of the jitter detection source signals 36 and 37 and the capture signal 39, with reference with FIGS. 1, 6, and 7. The circuit and the generation principle described for the first embodiment are merely examples, and the jitter detection preprocessing circuit 28 of the present invention is not restricted thereto.

The first demodulation preprocessing signal 24 and the second demodulation preprocessing signal 25 are input to the edge selection circuit 31. The edge selection circuit 31 has a function of determining as to whether a position wherein the first demodulation preprocessing signal 24 and the second demodulation preprocessing signal 25 have opposite polarities is a rising edge or a falling edge, and selecting one of the edges to output an edge selection flag 32.

For example, as shown in FIGS. 6(*e*), 6(*f*) and 7, when the edge selection circuit 31 selects a rising edge, the edge selection circuit 31 outputs an edge selection flag 32 for each of the rising edges of the first demodulation preprocessing signals 24A~24F and the second demodulation preprocessing signals 25A~25F, in accordance with the sampling clock 8, with the first demodulation preprocessing signal 24A and the second demodulation preprocessing signal 25A being a pair. Next, the edge selection flags 32, playback speed information 201 of the optical recording medium 1, and operation performance information 202 of the digital signal operation circuit 29 are input to the operation time management circuit 33, and an updation flag 34 for selecting a jitter detection source signal 36 and a jitter detection source signal 37 to be used for actual jitter extraction from among the selected edge selection flags 32 is generated. At this time, the jitter detection source signal 36 and the jitter detection source signal 37 are data to be processed in parallel with the timing of the sampling clock 8, for a pair of the data having the phase of the actual sampling point and the data having the missing phase, which is restored by the Nyquist interpolation filter 23.

The playback speed information 201 is the playback speed of the optical disc, which is given from a means for controlling the optical disc device, i.e., the system controller 200. For example, when playback is carried out by the CLV (Constant Linear Velocity) method, the playback speed information 201 indicates that the optical disc playback speed is 1X~16X. On the other hand, when playback is carried out by the CAV (Constant Angular Velocity) method, it indicates the actual playback speed information that is indexed.

The operation time management circuit 33 includes an updation cycle management counter 33a which resets the count value and increments it in accordance with the sampling clock 8 when both of the edge selection flag 32 and the updation flag 34 are "1", as shown in FIGS. 6(e) and 6(f). Assuming that the digital signal operation circuit 29 requires, for arithmetic operation, at least a period that is longer than 4 Th×N (Th: period twice as long as the channel bit rate, N: positive integer), the updation cycle management counter 33a is set at the updation allowance count value "5" which is longer than 4 Th×1=4 Th, when 1X playback (N=1) is carried out. FIG. 6(e) shows the case where the updation allowance count value is "5". When the updation cycle management counter reaches "5", the count is once held, and thereafter, the updation flag 34 is asserted from "0" to "1", and the updation flag 34 is negated from "1" to "0" when the updation cycle management counter is reset to "1". When both of the edge selection flag 32 and the updation flag 34 are "1", the holding circuit 35 for arithmetic operation holds and outputs the jitter detection source signal 36 and the jitter detection source signal 37 from the first demodulation preprocessing signal 24 and the second demodulation preprocessing signal 25. In the case of FIG. 6(e), the demodulation preprocessing signals 24A and 25A, the demodulation preprocessing signals 24C and 25C, the demodulation preprocessing signals 24D and 25D, and the demodulation preprocessing signals 24E and 25E are the targets to be subjected to extraction of jitter information 30. The capture signal generation circuit 38 generates a capture signal 39 of the jitter detection source signal 36 and the jitter detection source signal 37 in the digital signal operation circuit 29, from the edge selection flag 32 and the updation flag 34.

In this way, it is possible to generate an optimum source signal for jitter detection, which realizes accurate jitter detection, without reinforcing the arithmetic processing ability of the digital signal operation circuit 29, according to the playback speed of the optical recording medium and the pattern of codes recorded on the optical recording medium (the pattern reflects whether the recording signal is a high-frequency signal or a low-frequency signal).

Further, when the playback speed is twice faster than that in the case shown in FIG. 6(e), the updation allowance count value is set to "9" or "10" which is longer than 4 Th×2=8 Th. FIG. 6(f) shows the case where the updation allowance count value is set to "10", whereby the jitter detection source signal 36 and the jitter detection source signal 37 can be updated in accordance with the operation performance of the digital signal operation circuit 29. In the case of FIG. 6(f), the demodulation preprocessing signals 24A and 25A and the demodulation preprocessing signals 24D and 25D are the targets to be subjected to extraction of jitter information 30.

Usually, when the playback speed is increased, since the processing capability for converting the jitter detection source signal into the jitter information 30 reaches the limit due to the arithmetic performances of the multiplier and the divider in the digital signal operation circuit 29, there occurs a limit in the playback speed at which the accurate jitter information 30 can be extracted. However, as shown in FIGS. 6(e) and 6(f), by controlling the generation timing of the jitter detection source signal on the basis of the playback speed information and the operation performance information, the jitter information 30 can be extracted with the highest efficiency, i.e., the highest accuracy, with respect to the playback speed and the recording code pattern. As shown in the center of FIG. 6(e), in the area where the frequency is low, updation flags appear for all edge selection flags, respectively, and the first and second demodulation preprocessing signals are sampled at the timings corresponding to the zerocross points. However, as shown in the left and right sides in FIG. 6(e), in the areas where the frequency is high, generation of updation flags which should be generated for the respective edge selection flags, is partially suppressed.

To be specific, with reference to FIG. 6(e), the frequency is higher in the area from the vicinity of the demodulation preprocessing signals 24A and 25A to the vicinity of the demodulation preprocessing signals 24C and 25C which is on the left side in FIG. 6(e) and in the area from the vicinity of the demodulation preprocessing signals 24E and 25E to the vicinity of the demodulation preprocessing signals 24F and 25F which is on the right side in FIG. 6(e), than in the area from the vicinity of the demodulation preprocessing signals 24C and 25C to the vicinity of the demodulation preprocessing signals 24E and 25E which is in the center of FIG. 6(e). However, on the left and right sides, thinning-out is carried out when obtaining the jitter detection source signals 36 and 37, for example, the demodulation preprocessing signals 24B and 25B between the demodulation preprocessing signals 24A and 25A and the demodulation preprocessing signals 24C and 25C are thinned out. Thereby, accurate jitter information can be calculated without the necessity of increasing the processing capability of the digital arithmetic processing circuit 29.

The jitter detection preprocessing circuit 28 according to the first embodiment enables thinning-out of sampling of the first demodulation preprocessing signals 24 and the second demodulation preprocessing signals 25 during high-frequency playback, i.e., an increase in intervals of sampling of the first and second demodulation preprocessing signals 24 and 25. To be specific, in the jitter detection preprocessing circuit 28, the edge selection circuit 31 selects the edges of the first and second demodulation preprocessing signals 24 and 25 to generate edge selection flags 32. The operation time management circuit 33 generates updation flags 34 for all edge selection flags 32 during low-frequency operation, and generates updation flags 34 for certain edge selection flags 32 during high-frequency operation, in accordance with the playback speed information 201 and the operation performance information 202 which are supplied from the system controller 200. The holding circuit 35 for arithmetic operation obtains a new first demodulation preprocessing signal 24 and a new second demodulation preprocessing signal 25 only when the edge selection flag 32 and the updation flag 34 are simultaneously supplied. Thereby, the jitter detection source signals 36 and 37 to be supplied to the digital signal operation circuit 29 can be thinned out during high-frequency operation. The capture signal generation circuit 38 generates capture signals 39 on the basis of the edge selection flags 32 and the updation flags 34, thereby controlling the timing at which the digital signal operation circuit 29 takes the first demodulation preprocessing signal 24 and the second demodulation preprocessing signal 25. The playback speed information 201 and the operation performance information 202 may be supplied from, for example, a memory such as a ROM, by CPU software that is not shown.

Figure 6A:
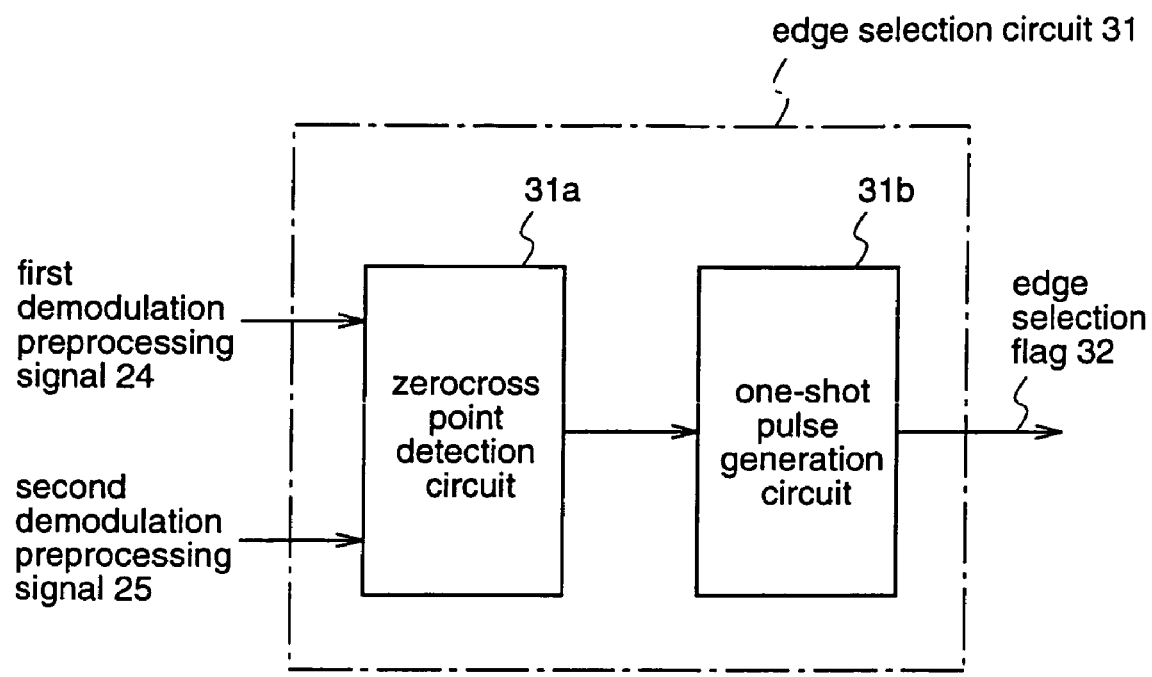
FIG. 6(a) is a diagram illustrating the construction of an edge selection circuit according to the first embodiment.

The edge selection circuit 31 may be constituted as shown in FIG. 6(a). That is, the edge selection circuit 31 includes a zerocross point detection circuit 31a and a one-shot pulse generation circuit 31b.

The zerocross point detection circuit 31a detects zerocross points of the first and second demodulation preprocessing signals 24 and 25, in like manner as that described for the linear interpolation filter 18 shown in FIG. 5(a). The one-shot pulse generation circuit 31b generates a one-shot pulse corresponding to one cycle of the sampling clock 8, with the zerocross point detection signal from the zerocross point detection circuit 31a being a trigger.

Figure 6B:
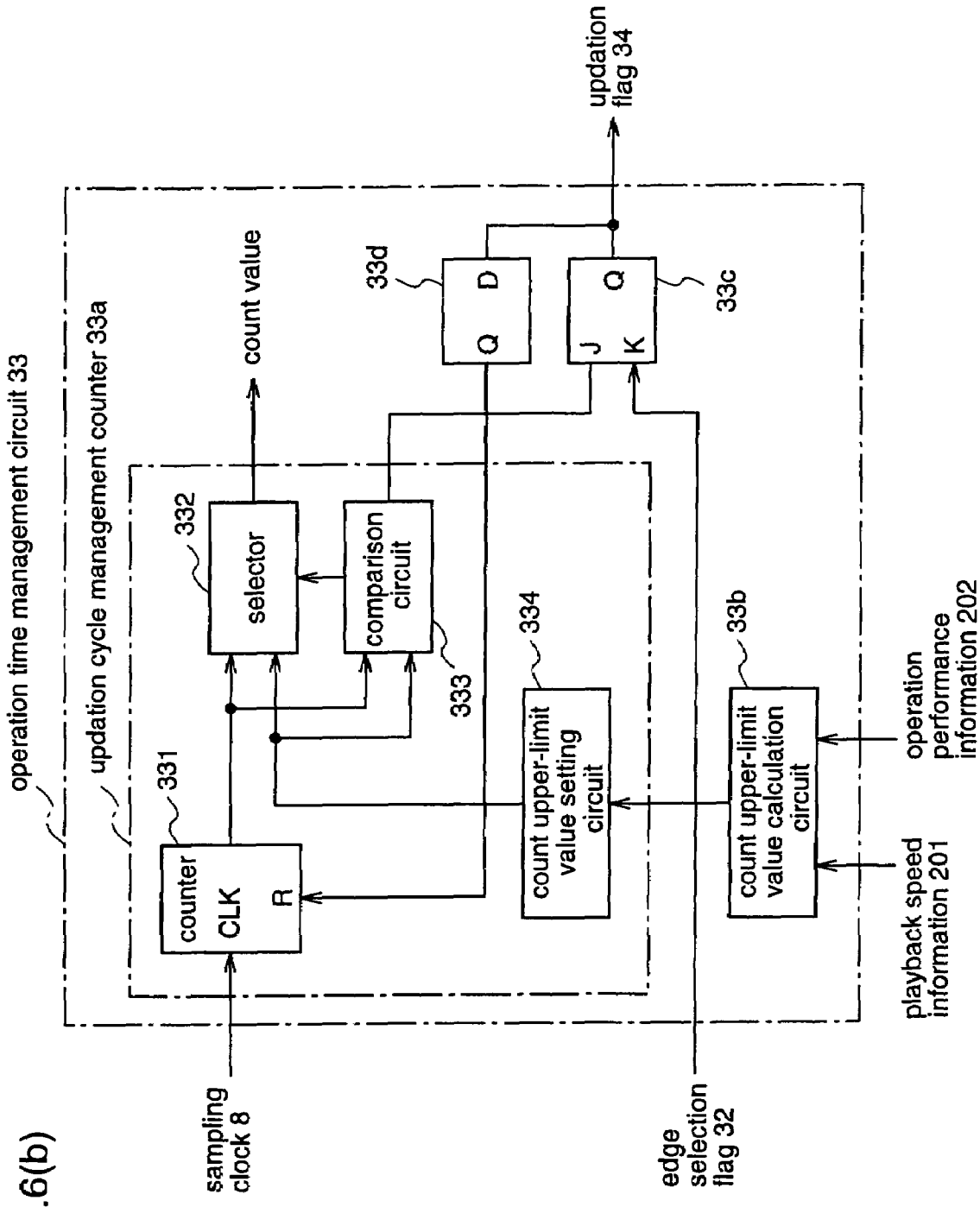
FIG. 6(b) is a diagram illustrating the construction of an operation time management circuit according to the first embodiment.

The operation time management circuit 33 may be constituted as shown in FIG. 6(b). That is, the operation time management circuit 33 includes an updation cycle management counter 33a, a count upper-limit calculation circuit 33b, a JK flip-flop 33c, and a D flip-flop 33d.

The updation cycle management counter 33a includes a counter 331, a selector 332, a comparison circuit 333, and a count upper-limit setting circuit 334.

Figures 6C, 6D:
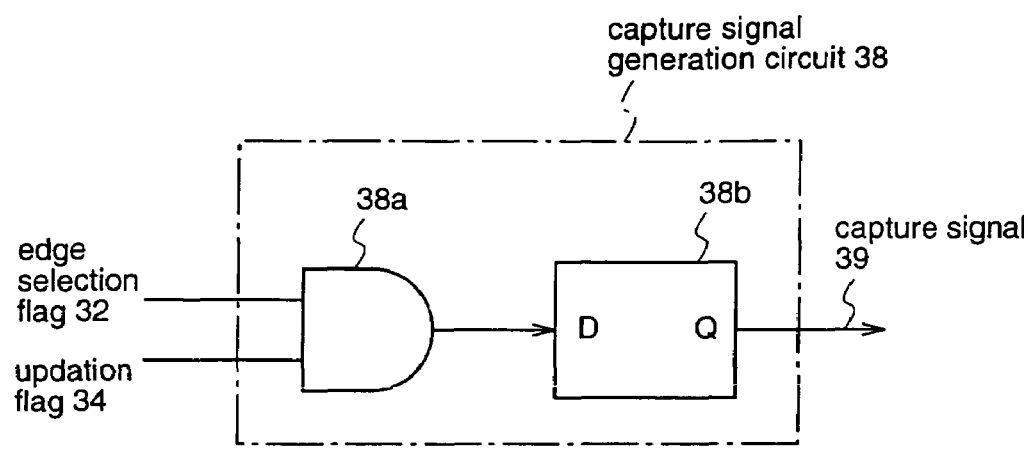
FIG. 6(c) is a diagram illustrating the construction of a capture signal generation circuit according to the first embodiment.
FIG. 6(d) is a diagram illustrating an example of operation performance information according to the first embodiment.

The count upper-limit calculation circuit 33b receives the playback speed information 201 and the operation performance information 202 from the system controller 200. The playback speed information 201 is a numerical value indicating the playback speed of the optical recording medium as described above. The operation performance information 202 is, for example, data corresponding to a table indicating relationships between commands of the digital signal operation circuit 29 and execution times required for the commands as shown in FIG. 6(d), or it may be performance indices of the digital signal operation circuit 29, such as MIPS (Million Instructions Per Second) values or FLOPS (Floating point number Operations Per Second) values which have previously been calculated on the basis of the relationships.

The count upper-limit value calculation circuit 33b calculates a count upper-limit value on the basis of the playback speed information 201 and the operation performance information 202, and transmits the count upper-limit value to the count upper-limit setting circuit 334. As described above, the count upper-limit value calculation circuit 33b may calculate a value that is corrected so as to exceed the playback speed information 201 by the operation performance information 202.

The counter 331 counts the sampling clock 8 from "1", and the comparison circuit 333 compares the count value with the upper-limit value that is set in the upper-limit value setting circuit 334. The comparison circuit 333 controls the selector 332 so as to select the count upper-limit value setting circuit 334 only when the count value matches the count upper-limit value. Once the count value reaches the upper limit, the output of the updation cycle management counter 33a maintains the upper-limit value.

The JK flip-flop 33c outputs "H" from the Q output when both of the output signal of the comparison circuit 333 and the edge selection flag 32 become "H". The Q output "H" is delayed by one cycle of the sampling clock 8 by the D flip-flop 33d, and resets the counter 331. Further, when the edge selection flag 32 becomes "L", the Q output of the JK flip-flop 33c becomes "L". Since the updation flag 34 is the Q output of the JK flip-flop 33c, it becomes "H" when the count value of the counter 331 reaches the count upper-limit value, and becomes "L" when the edge selection flag 32 becomes "L".

When the edge selection circuit 31 selects a falling edge, as shown in FIG. 6(g), the edge selection circuit 31 outputs an edge selection flag 32 for each of the falling edges of the first demodulation preprocessing signals 24G~24K and the second demodulation preprocessing signals 25G~25K, in accordance with the sampling clock 8, with the first demodulation preprocessing signal 24G and the second demodulation preprocessing signal 25G being a pair. The updation allowance count value is set at "5", like the case of FIG. 6(e). In the case of FIG. 6(g), the demodulation preprocessing signals 24G and 25G, the demodulation preprocessing signals 24I and 25I, and the demodulation preprocessing signals 24J and 25J, which are the falling edges, are the targets to be subjected to extraction of jitter information 30.

As described above, the jitter information 30 is detected for the rising edge and the falling edge, respectively, and the jitter information 30 for the rising edge is compared with the jitter information 30 for the falling edge, thereby detecting a tangential tilt that occurs due to a longitudinal inclination in the rotation signal direction of the optical disc medium 1, i.e., in the track direction. Therefore, it is possible to previously suppress the tangential tilt, and further, it is possible to perform adjustment for preventing influences of waveform lift-right asymmetrical strain, frame strain, and the like which are caused by the tangential tilt.

The capture signal generation circuit 38 may be constituted as shown in FIG. 6(c). That is, the capture signal generation circuit 38 includes an AND gate 38a and a D flip-flop 38b.

A logical AND between the edge selection flag 32 and the updation flag 34 is generated by the AND gate 38a, and an "H" output thereof is delayed by one cycle of the sampling clock 8 using the D flip-flop 38b, thereby generating a capture signal 39.

As described above, the digital signal operation circuit 29 receives the jitter detection source signals 36 and 37 and the capture signal 39 which are generated by the jitter detection preprocessing circuit 28 according to the playback speed of the optical recording medium and the pattern of the codes recorded on the optical recording medium, and detects the jitter information 30.

Hereinafter, the circuit construction of the digital signal operation circuit 29 and the generation principle of the jitter information 30 will be described with reference to FIGS. 8 and 9. The circuit and the generation principle shown in FIGS. 8 and 9 are merely examples, and the present invention is not restricted thereto.

Figure 8:
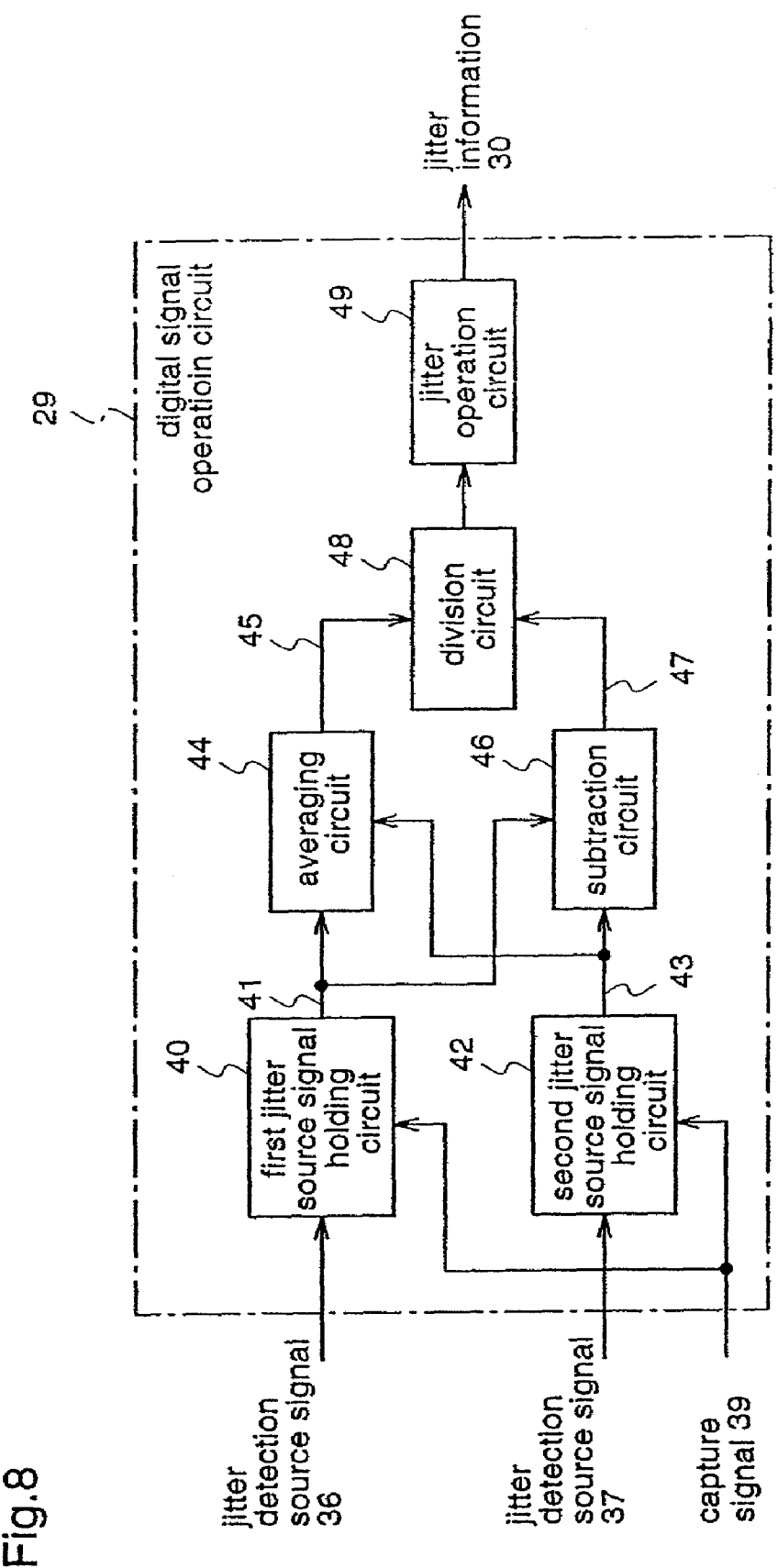
FIG. 8 is a block diagram illustrating the construction of a digital signal operation circuit according to the first embodiment.
Figure 9:
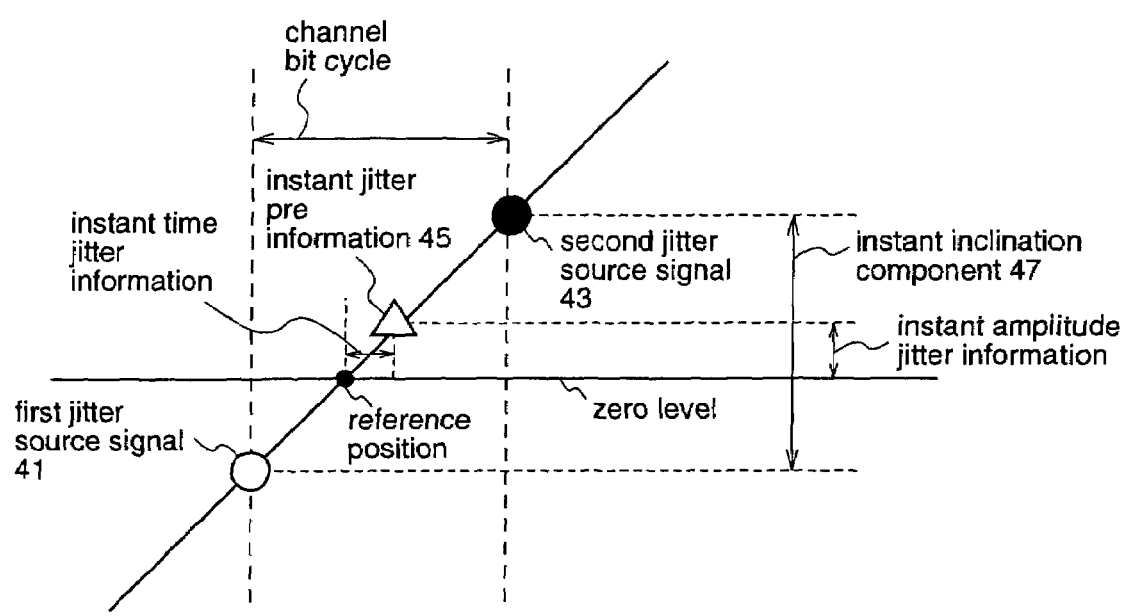
FIG. 9 is a diagram for explaining the detection principle of jitter information according to the first embodiment.

As shown in FIG. 8, the digital signal operation circuit 29 includes a first jitter source signal holding circuit 40, a second jitter source signal holding circuit 42, an averaging circuit 44, a subtraction circuit 46, a division circuit 48, and a jitter operation circuit 49.

The first jitter source signal holding circuit 40 holds the jitter detection source signal 36 at the falling edge of the capture signal 39, and outputs a first jitter source signal 41. At the same time, the second jitter source signal holding circuit 42 holds the jitter detection source signal 37 at the falling edge of the capture signal 39, and outputs a second jitter source signal 43. For example, in FIG. 9, the first jitter source signal 41 is shown by "○" while the second jitter source signal 43 is shown by "●". The first jitter source signal 41 and the second jitter source signal 43 are input to the averaging circuit 44, wherein instant jitter pre information 45 shown by "Δ" in FIG. 9 is generated. Assuming that the distance in the amplitude direction from the zero level of the instant jitter pre information 45 is instant amplitude jitter information, when this signal is projected in the time direction, it corresponds to instant time jitter information. On the other hand, the first jitter source signal 41 and the second jitter source signal 43 are input to the subtraction circuit 46, thereby generating an instant inclination component 47. The instant inclination component 47 corresponds to a channel bit period when it is projected in the time direction in the case where the vicinity of the center level of the signal to be subjected to jitter detection has linearity. Next, the division circuit 48 divides the instant jitter pre information 45 by the instant inclination component 47, and thereafter, the jitter operation circuit 49 calculates a root mean square (RMS) of the output signal of the division circuit 48. To be specific, the output signal of the division circuit 48 is squared, and the resultant signals are added by M times (M: positive integer) with the cycle of the capture signal 39 and averaged, and thereafter, the ½-th power of the resultant value is calculated, thereby detecting the jitter information 30.

When the information in the time direction is developed into the information in the amplitude direction, the following relationship can be derived.

$$\left(\frac{\text{instant time jitter information}}{\text{channel bit frequency}}\right)^2 = \left(\frac{\text{instant amplitude jitter information}}{\text{instant inclination component 47}}\right)^2 \quad (1)$$

Accordingly, the squared instant jitter information at the zerocross position can be calculated as follows.

$$(\text{instant jitter information})^2 = \left(\frac{\text{instant jitter pre information 45}}{\text{first jitter source signal 41} - \text{second jitter source signal 43}}\right)^2 \quad (2)$$

Since the jitter information 30 thus extracted serves as an indicator which indicates the quality of the playback RF signal 3 and the quality of the digital RF signal 6, it is possible to accurately recognize the quality of the data recorded on the optical disc medium 1, and further, it is possible to perform more accurate adjustment when carrying out focus servo balance learning to minimize the value of the jitter information 30 or adjustment of the boost quantity and the cutoff frequency of the equal ripple filter in the playback RF signal adjustment circuit 4, resulting in improved playback performance.

Through the above-mentioned sequence of operations, extraction of accurate jitter information 30 can be realized in the playback signal processing method in which sampling is carried out with a cycle twice as long as the channel bit rate.

Further, since detection of jitter which serves as an indicator for playback signal quality can be carried out with high accuracy even during high-speed playback, it is possible to accurately perform, for example, adjustment for the cutoff frequency and boost learning of the analog equalizer for improving the jitter of the playback RF signal 3, as well as adjustment of the best point in balance learning in focus servo relating to performance of the playback RF signal 3, whereby the playback signal quality is improved even during high-speed playback.

Furthermore, since extraction of accurate jitter information 30 enables constitution of a detection system in a large-scale integrated circuit, the recording quality of digital data recorded on the optical recording medium 1 can be easily checked. Thereby, the detected jitter information 30 can also serve as an indicator for improvement in the quality of the recorded data. Further, processing such as screening of defectives in driving systems and servo systems of optical disc devices during fabrication is also simplified.

FIG. 7 shows the case where a jitter detection source signal 36 and a jitter detection source signal 37 are generated with a cycle that does not depend on the pattern of recorded codes but depends on only the playback speed of the optical recording medium, for example, the case where the signals 36 and 37 are generated by operating the updation management cycle counter in the operation time management circuit 33 with reference to the rising edges or the falling edges of the first and second demodulation preprocessing signals. According to this method, the rising edge or the falling edge can be obtained independently of the frequencies of the first and second demodulation preprocessing signals.

The circuit and the generation principle shown in FIG. 7 are merely examples, and the present invention is not restricted thereto.

Figure 7A:
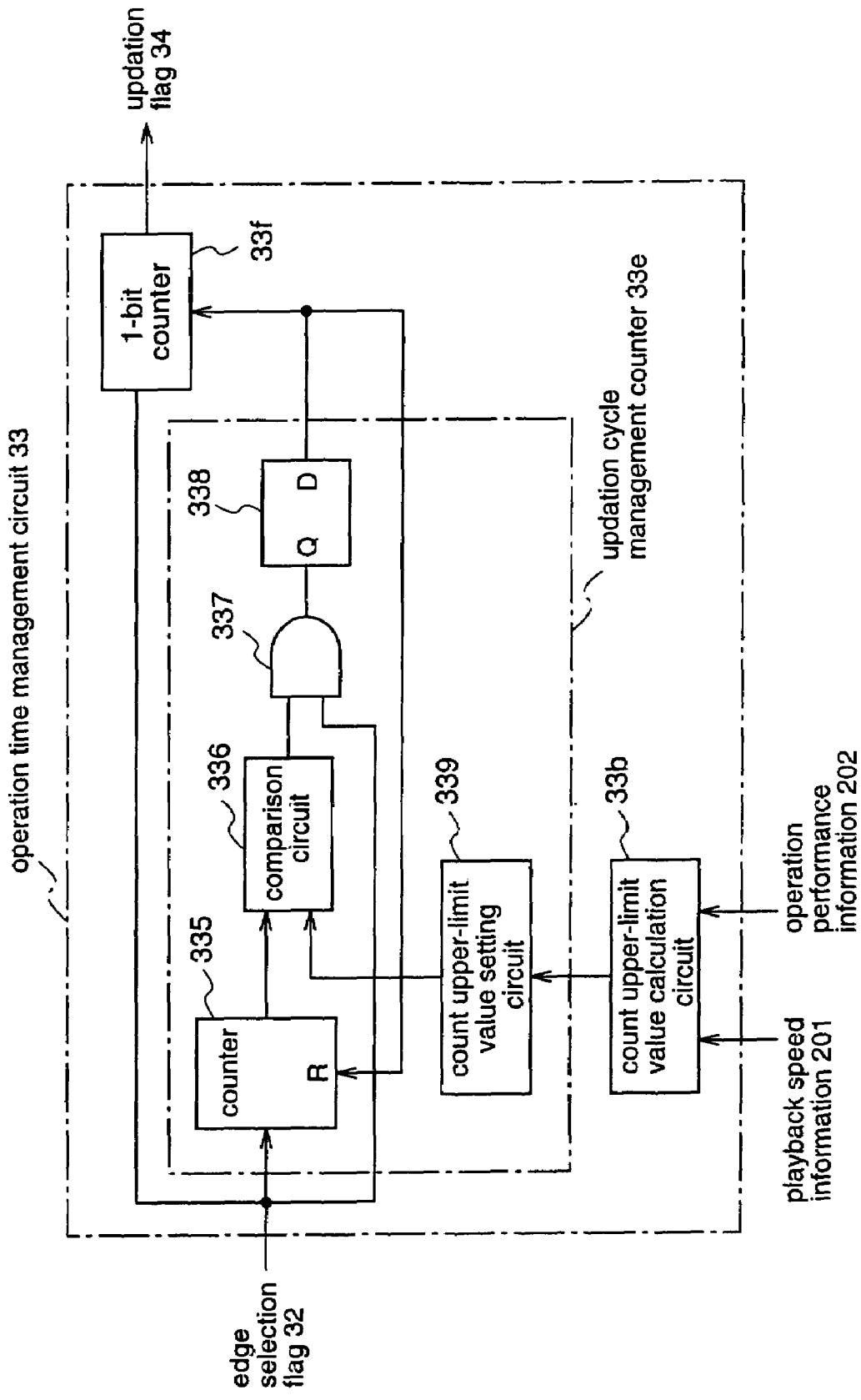
FIG. 7(a) is a diagram for explaining another construction of an operation time management circuit according to the first embodiment.

In the case of FIG. 7, the operation time management circuit 33 may be constructed as shown in FIG. 7(a). That is, the operation time management circuit 33 includes an updation cycle management counter 33e, a count upper-limit value calculation circuit 33b, and a 1-bit counter 33f.

The updation cycle management counter 33e includes a counter 335, a comparison circuit 336, an AND gate 337, a D flip-flop 338, and a count upper-limit value setting circuit 339.

The counter 335 counts the edge selection flags 32 successively. The comparison circuit 336 compares the count value with the count upper-limit value that is set in the count upper-limit value setting circuit 339. The comparison circuit 336 outputs "H" when the count value matches the count upper-limit value, and the AND gate 337 outputs an AND "H" when the edge selection flag 32 becomes "H". The 1-bit counter 33f counts the edge selection flag 32 at 1 bit, and its output (1 bit) is inverted every time an edge selection flag 32 is inputted. The output "H" of the AND gate 337 is delayed by one cycle of the sampling clock 8 by the D flip-flop 338, and resets the counter 335 and the 1-bit counter 33f. The output of the 1-bit counter 33f becomes an updation flag 34.

The constructions of the edge selection circuit 31 and the capture signal generation circuit 38 are identical to those shown in FIGS. 6(a) and 6(c), respectively.

As shown in FIG. 7(b), the updation cycle management counter 33e in the operation time management circuit 33 may count the edge selection flag 32. While in this case the updation allowance count value is set at "2", it may be set at 2×L (L: positive integer). When the updation cycle management counter 33e reaches "2", the value is held, and thereafter, the updation flag 34 is asserted from "0" to "1", and the updation flag 34 is negated from "1" to "0" when the updation cycle management counter 33e is reset to "1". When both of the edge selection flag 32 and the updation flag 34 are "1", the jitter detection source signal 36 and the jitter detection source signal 37 are held and outputted from the first demodulation preprocessing signal 24 and the second demodulation preprocessing signal 25 by the holding circuit 35 for arithmetic operation.

In the case of FIG. 7, the demodulation preprocessing signals 24A and 25A, the demodulation preprocessing signals 24C and 25C, the demodulation preprocessing signals 24E and 25E are the targets to be subjected to extraction of jitter information 30. The capture signal generation circuit 38 generates a capture signal 39 of the jitter detection source signal 36 and the jitter detection source signal 37 in the digital signal operation circuit 29, from the edge selection flag 32 and the updation flag 34.

As described above, by employing the method of performing thinning-out to the edges to be subjected to jitter detection, variations in the number of jitters to be extracted from the respective patterns are reduced as compared with the method of considering the pattern length of the recorded codes shown in FIG. 1, whereby detection of jitter information 30 to which the whole characteristics are reflected can be realized without being biased to long patterns.

As described above, according to the first embodiment, when the playback RF signal 3 reproduced from the optical disc medium 1 is digitized and the demodulated to obtain the digital binary signal 27, the playback RF signal 3 is converted into a digital signal in synchronization with the sampling clock 8 having a cycle twice as long as the channel bit cycle, and thereafter, the signal passing through the offset correction circuit 9 and the signal obtained by demodulating the time components which are missing from that signal are respectively held to generate the jitter detection source signals 36 and 37, and jitter information is extracted on the basis of the jitter detection source signals 36 and 37. At this time, considering the performance of the digital signal operation circuit 29 for extracting the jitter information, the output rates of the jitter detection source signal 36 and the jitter detection source signal 37 are controlled according to the playback speed of the optical recording medium, or the playback speed and the pattern length of the recorded codes. Therefore, in the playback signal processing system for performing sampling at a cycle twice as long as the channel bit rate during high-speed playback, extraction of accurate jitter information 30 is realized. Further, since the division circuit in the digital signal operation circuit can be operated at a low speed, it is possible to suppress an increase in the circuit scale of the division circuit for higher playback speed, and an increase in power consumption for high-speed operation of the division circuit.

Embodiment 2

FIG. 10 is a block diagram illustrating the construction of an optical disc device having a jitter detection apparatus according to a second embodiment of the present invention.

This second embodiment is different from the first embodiment in that the jitter detection preprocessing circuit 28 generates a jitter detection source signal 51 not as a parallel signal but as a serial signal, and accordingly, generation of a capture signal 53 for the jitter detection source signal 51 is suited to the capture of a serial signal, and the interface of the digital signal operation circuit 54 is changed to serial interface.

With respect to the interface of the digital signal operation circuit, while in the first embodiment a jitter detection source signal 36 and a jitter detection source signal 37 are generated as parallel signals, in this second embodiment a first demodulation preprocessing signal 24 and a second demodulation preprocessing signal 25 to be subjected to jitter extraction are serially developed in the time direction for every edge selection flag 32 and held, thereby to put these signals 24 and 25 into a single jitter detection source signal 51, and thereafter, the jitter detection source signal 51 is captured in the digital signal operation circuit 54 to extract jitter information 30 from the signal 51.

When the digital signal operation circuit 54 is provided outside a large-scale integrated circuit and is connected to a terminal of the large-scale integrated circuit using a jig such as a probe to constitute a jitter detection apparatus, the above-mentioned method can simplify interface between the circuits.

Hereinafter, the second embodiment will be described with reference to FIGS. 10, 11(a), and 11(b). The circuit and principle described below are merely examples, and the present invention is not restricted thereto.

Among the constituents shown in FIG. 10, a serial holding circuit 50 for arithmetic operation, a capture signal generation circuit 52, and a digital signal operation circuit 54 in the jitter detection preprocessing circuit 28 are different from those shown in FIG. 1. Since other constituents are identical to those described for the first embodiment, repeated description is not necessary.

In the jitter detection preprocessing circuit 28 shown in FIG. 10, for example, when the edge selection circuit 31 selects a rising edge, the edge selection circuit 31 outputs an edge selection flag 32 for each of the rising edges of the first demodulation preprocessing signals 24A~24F and the second demodulation preprocessing signals 25A~25F, in accordance with the sampling clock 8, with the first demodulation preprocessing signal 24A and the second demodulation preprocessing signal 25A being a pair. Next, the edge selection flags 32, the playback speed information 201, and the operation performance information 202 of the digital signal operation circuit 59 are input to the operation time management circuit 33, and an updation flag 34 for selecting a jitter detection source signal 51 to be used for actual jitter extraction from among the selected edge selection flags 32 is generated. As shown in FIG. 11(a), the operation time management circuit 33 includes an updation cycle management counter 33a which resets the count value and increments the count value in accordance with the sampling clock 8, when both of the edge selection flag 32 and the updation flag 34 are "1". In the updation cycle management counter 33a shown in FIG. 11(a), the updation allowance count value is set at "3" in accordance with the playback speed information 201 and the operation performance information 202. When the updation cycle management counter 33a reaches "3", this value is held and then the updation flag 34 is asserted from "0" to "1", and thereafter, the updation flag 34 is negated from "1" to "0" when the updation cycle management counter 33a is reset to "1". The capture signal generation circuit 52 generates a capture signal 53 for the jitter detection source signal 51 in the digital signal operation circuit 54 on the basis of the edge selection flag 32 and the updation flag 34. The capture signal 53 may be a signal that is obtained by one-clock delaying a signal whose sign is inverted, when both of the edge selection flag 32 and the updation flag 34 are "1". When both of the edge selection flag 32 and the updation flag 34 are "1" and the capture signal 53 is "1", the serial holding circuit 50 holds the first demodulation preprocessing signal 24 in the position where jitter is to be extracted. When both of the edge selection flag 32 and the updation flag 34 are "1" and the capture signal 53 is "0", the serial holding circuit 50 holds the second demodulation preprocessing signal 25 in the position where jitter is to be extracted. Thereby, the jitter detection source signal 51 is serially held and outputted. In the case of FIG. 11(a), the demodulation preprocessing signals 24A and 25A, the demodulation preprocessing signals 24C and 25C, and the demodulation preprocessing signals 24E and 25E are the targets to be subjected to extraction of jitter information 30.

As described above, utilizing that the playback speed of the optical recording medium and the pattern of codes recorded on the optical recording medium reflect whether the signal is a high-frequency signal or a low-frequency signal, and the digital signal operation circuit 54 receives the jitter detection source signal 51 and the capture signal 53 which are generated by the jitter detection preprocessing circuit 28 according to the code pattern, and detects the jitter information 30.

Hereinafter, the circuit construction of the digital signal operation circuit 54 and the generation principle of the jitter information 30 will be described with reference to FIGS. 9 and 12. The circuit and the generation principle shown in FIGS. 9 and 12 are merely examples, and the present invention is not restricted thereto.

Figure 12:
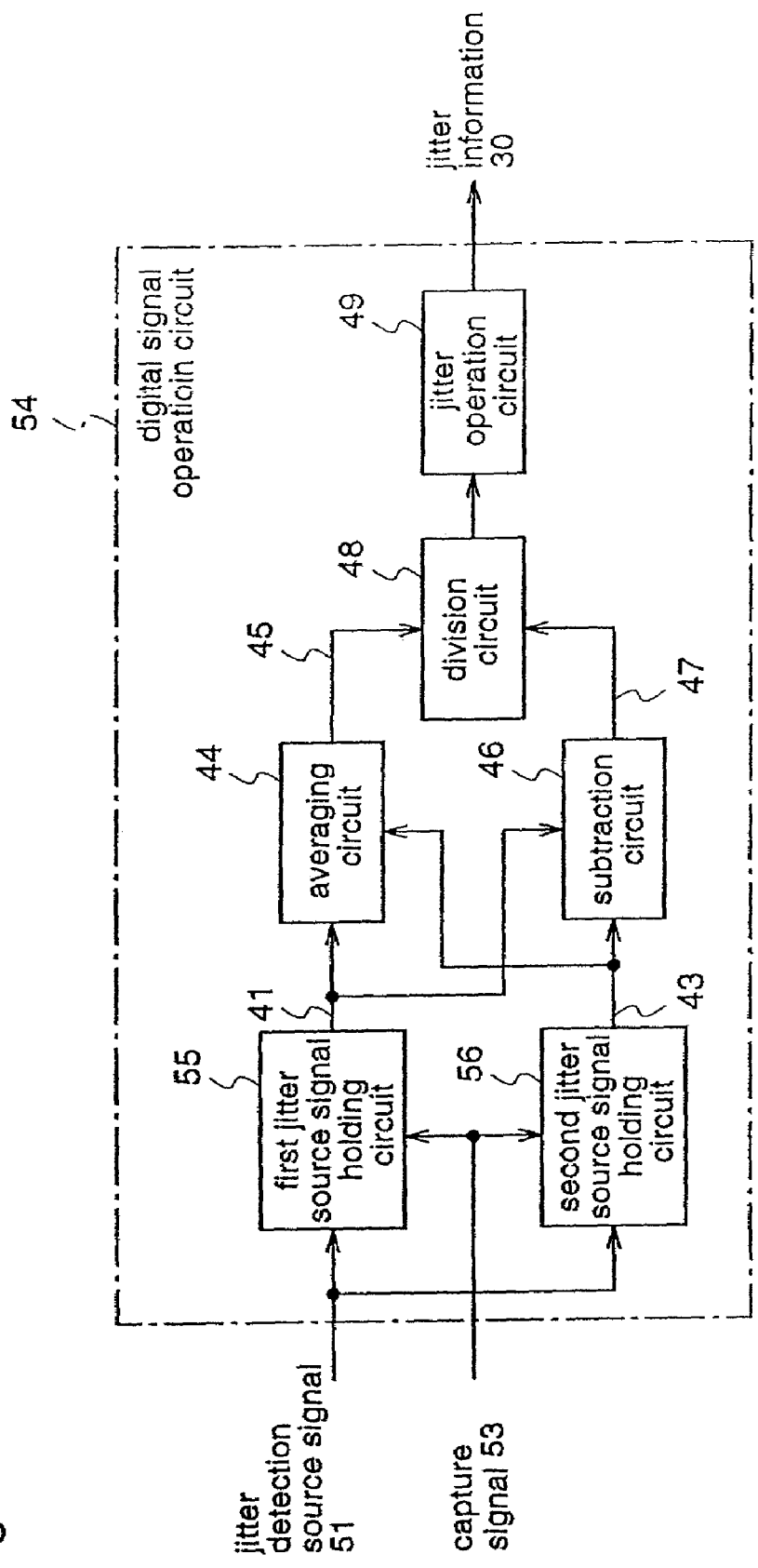
FIG. 12 is a block diagram illustrating the construction of a digital signal operation circuit according to the second embodiment.

As shown in FIG. 12, the first jitter source signal holding circuit 55 holds the jitter detection source signal 51 at the falling edge of the capture signal 53, and outputs the first jitter source signal 41. On the other hand, the second jitter source signal holding circuit 56 holds the jitter detection source signal 37 at the rising edge of the capture signal 53, and outputs the second jitter source signal 43. For example, in FIG. 9, the first jitter source signal 41 is shown by "○" and the second jitter source signal 43 is shown by "●", respectively. The first jitter source signal 41 and the second jitter source signal 43 are input to the averaging circuit 44, wherein instant jitter pre information 45 shown by "Δ" is generated. At this time, assuming that the distance in the amplitude direction from the zero level of the instant jitter pre information 45 is instant amplitude jitter information, when this signal is projected in the time direction, it corresponds to instant time jitter information. On the other hand, the first jitter source signal 41 and the second jitter source signal 43 are input to the subtraction circuit 46, thereby generating an instant inclination component 47. That is, in the case where the vicinity of the center level of the signal to be subjected to jitter detection has linearity, when this signal is projected in the time axis direction, the projection of the signal corresponds to the channel bit frequency. Next, the division circuit 48 divides the instant jitter pre information 45 by the instant inclination component 47, and thereafter, the jitter operation circuit 49 calculates an RMS of the output signal of the division circuit 48. To be specific, the output signal of the division circuit 48 is squared, and the resultant signals are added by M times (M: positive integer) with the cycle of the capture signal 53 and averaged, and thereafter, the ½-th power of the resultant value is calculated, thereby detecting the jitter information 30.

As described above, since the method of extracting the jitter information 30 by capturing the first demodulation preprocessing signal 24 and the second demodulation preprocessing signal 25 into the digital signal operation circuit 54 while serially maintaining these signals in the time direction is employed, the interface between the circuits becomes serial connection, and therefore, it is possible to simplify interface when the digital signal operation circuit 54 is provided outside a large-scale integrated circuit, and connected to the integrated circuit using a jig such as a probe.

Further, when the updation allowance count value of the updation cycle management counter of the operation time management circuit 33 is increased, variations in signals between devices can be minimized, and therefore, it is possible to reduce noise components that occur at the interface between devices and impede extraction of accurate jitter information 30.

FIG. 11(b) shows the case where a jitter detection source signal 51 is generated by operating the updation management cycle counter in the operation time management circuit 33, with reference to rising edges or falling edges of the first and second demodulation preprocessing signals, when the jitter detection source signal 51 is generated so that the generation cycle thereof does not depend on the pattern of recorded codes but depends on only the playback speed of the optical recording medium.

The generation principle shown in FIG. 11(b) is merely an example, and the present invention is not restricted thereto.

As shown in FIG. 11(b), the updation cycle management counter 33e in the operation time management circuit 33 may count the edge selection flags 32. In this case, the updation allowance count value is set at "4". When the updation cycle management counter 33e reaches "2", the updation flag 34 is asserted from "0" to "1", and negated from "1" to "0" at the next count value "3". When the updation cycle management counter 33e reaches "4", the updation flag 34 is asserted from "0" to "1", and negated from "1" to "0" when the updation cycle management counter 33e is reset to "1". The capture signal generation circuit 52 generates a capture signal 53 for the jitter detection source signal 51 on the basis of the edge selection flag 32 and the updation flag 34. This capture signal 53 may be a signal that is obtained by delaying a signal whose sign is inverted, by one clock of the sampling clock 8, when both of the edge selection flag 32 and the updation flag 34 are "1". When both of the edge selection flag 32 and the updation flag 34 are "1" and the capture signal 53 is "1", the serial holding circuit 50 for arithmetic operation holds the first demodulation preprocessing signal 24 in the position where jitter is to be extracted. When both of the edge selection flag 32 and the updation flag 34 are "1" and the capture signal 53 is "0", the serial holding circuit 50 holds the second demodulation preprocessing signal 25 in the position where jitter is to be extracted. Thereby, the jitter detection source signal 51 is serially held and outputted. In the case of FIG. 11(b), the first demodulation preprocessing signal 24A, the second demodulation preprocessing signal 25A and the first demodulation preprocessing signal 24E are the targets to be subjected to extraction of jitter information 30.

By employing the method of performing thinning-out of the edges to be subjected to jitter detection as described above, variations in the number of jitters to be extracted from the respective patterns are reduced as compared with the method of considering the pattern length of the recorded codes shown in FIG. 11(a), whereby detection of jitter information 30 to which the whole characteristics are reflected can be realized without being biased to long patterns.

As described above, according to the second embodiment, when the playback RF signal 3 reproduced from the optical disc medium 1 is digitized and demodulated to obtain the digital binary signal 27, the playback RF signal 3 is converted into a digital signal in synchronization with the sampling clock 8 having a cycle twice as long as the channel bit cycle, and thereafter, the signal passing through the offset correction circuit 9 and a signal obtained by demodulating the time components which are missing from that signal are respectively held to generate a jitter detection source signal 51, and jitter information is extracted on the basis of the jitter detection source signal 51. At this time, considering the performance of the digital signal operation circuit 54 for extracting jitter information, the output rate of the jitter detection source signal 51 is controlled in accordance with the playback speed of the optical recording medium, or the playback speed and the pattern length of recorded codes. Therefore, extraction of accurate jitter information 30 is realized in the playback signal processing system which performs sampling with a cycle twice as long as the channel bit rate during high-speed playback.

Further, the digital signal operation circuit 54 is provided outside the jitter detection preprocessing circuit 28, and the jitter detection preprocessing circuit 28 and the digital signal operation circuit 54 are connected by serial transmission. Therefore, interface can be simplified as compared with the case where these circuits are connected by parallel transmission.

Accordingly, in the case where the digital signal operation circuit 54 is provided outside a large-scale integrated circuit as a measurement circuit for measuring process jitters and the like, and the digital signal operation circuit 54 and the large-scale integrated circuit are connected by a jig such as a probe, the production cost of the jig can be reduced.

Embodiment 3

Figure 13:
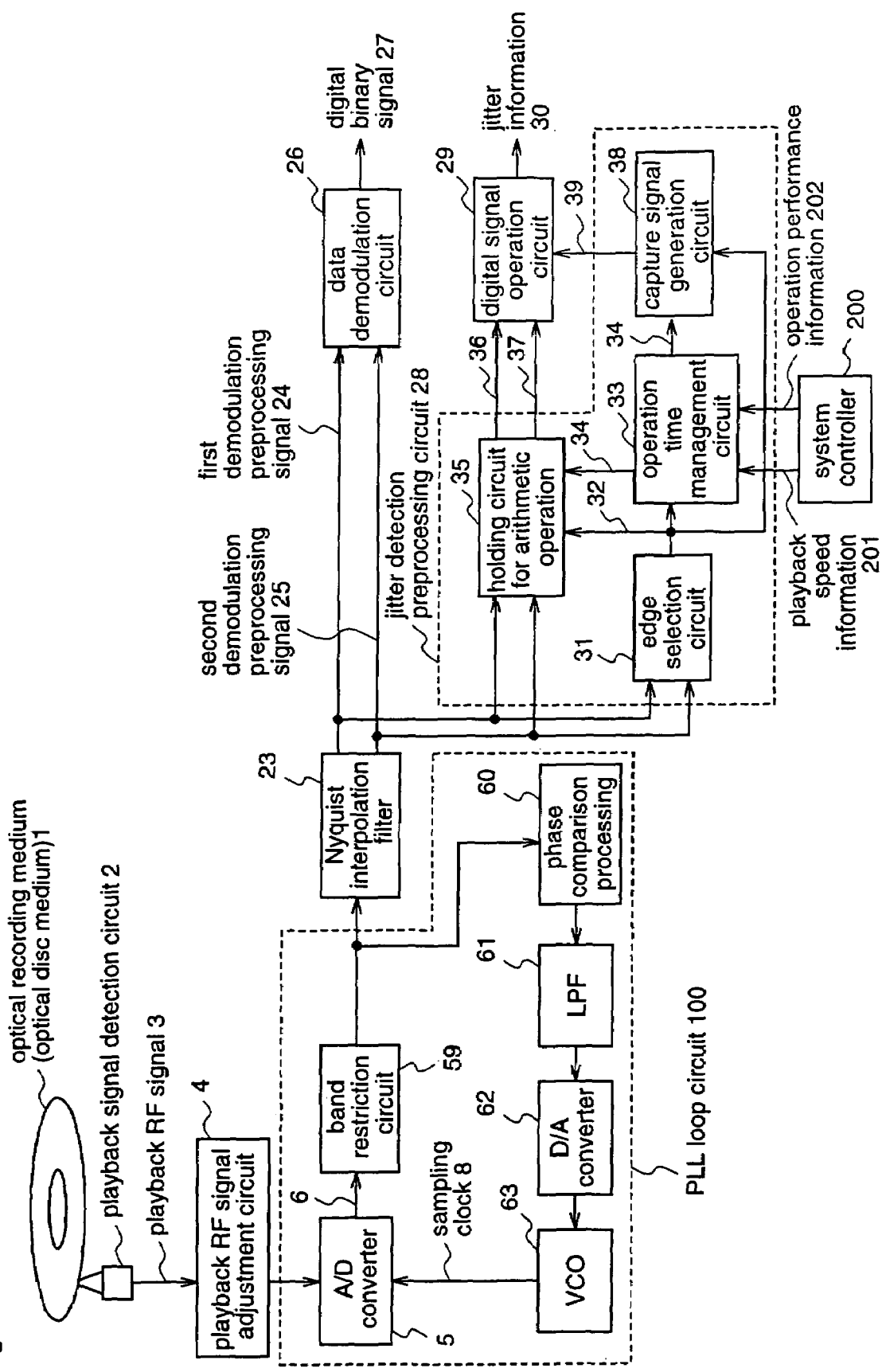
FIG. 13 is a block diagram illustrating the construction of an optical disc device having a jitter detection apparatus according to a third embodiment of the present invention.

FIG. 13 is a block diagram illustrating the construction of an optical disc device having a jitter detection apparatus according to a third embodiment of the present invention.

This third embodiment is different from the first embodiment in the construction of the PLL loop circuit. More specifically, while the first embodiment employs the PLL loop circuit 100 comprising the A/D converter 5, the offset correction circuit 9, the phase sync control circuit 17, and the clock generation circuit 7, it is also possible to employ the PLL loop circuit shown in FIG. 15 comprising the A/D converter 5, the band restriction circuit 59, the phase comparison processing block 60, the LPF 61, the D/A converter 62, and the VCO 63.

Figure 15:
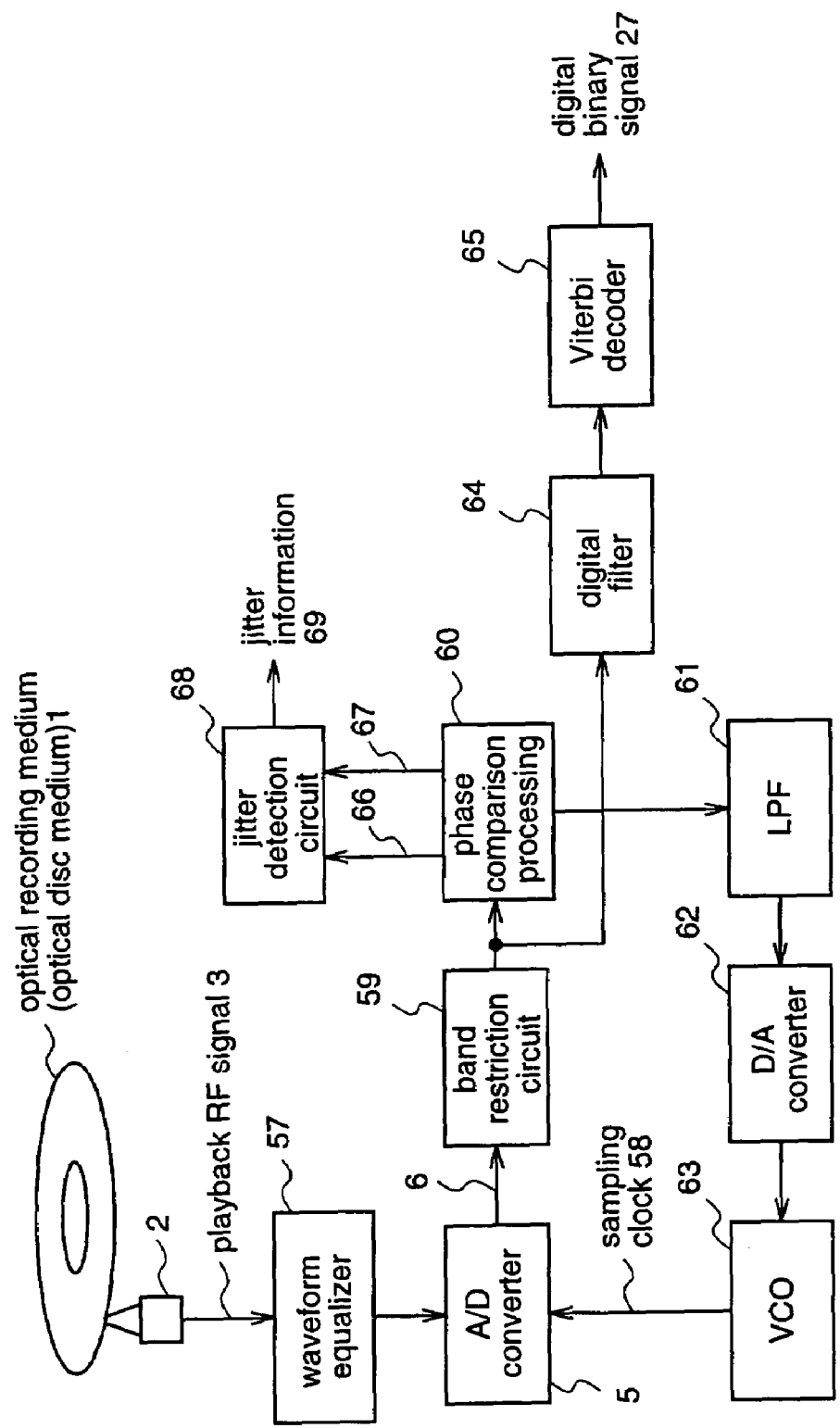
FIG. 15 is a block diagram illustrating the construction of the conventional optical disc device.

This third embodiment employs a PLL loop circuit of the same construction as the PLL loop circuit shown in FIG. 15 instead of the PLL loop circuit 100 of the first embodiment. Accordingly, the operation and effect of the third embodiment are identical to those described for the first embodiment. A sampling clock 8 generated by the VCO 63 is set to a cycle twice as long as the channel clock, like the first embodiment.

Embodiment 4

Figure 14:
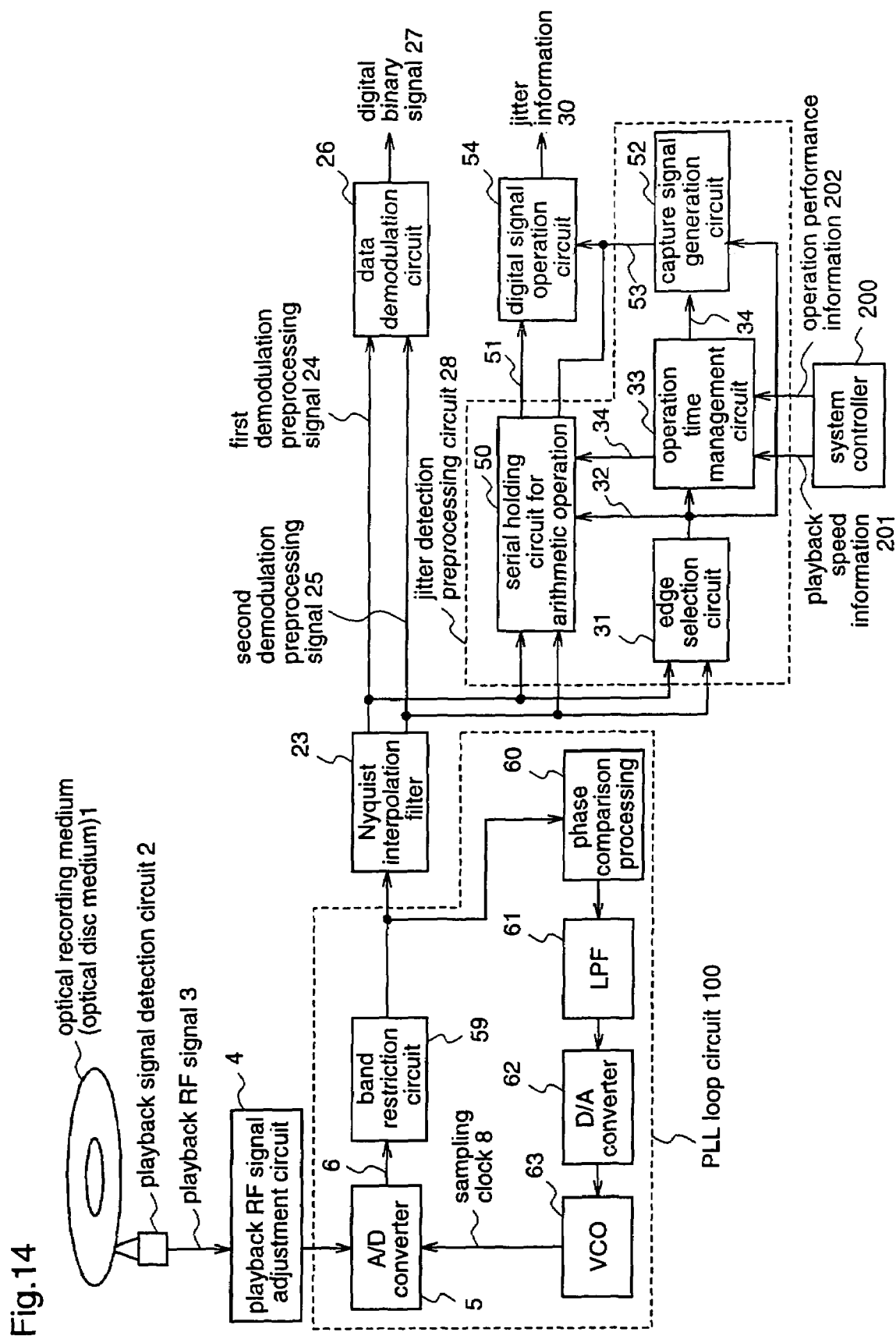
FIG. 14 is a block diagram illustrating the construction of an optical disc device having a jitter detection apparatus according to a fourth embodiment of the present invention.

FIG. 14 is a block diagram illustrating the construction of an optical disc device having a jitter detection apparatus according to a fourth embodiment of the present invention.

This fourth embodiment is different from the second embodiment in the construction of the PLL loop circuit. More specifically, while the second embodiment employs the PLL loop circuit 100 comprising the A/D converter 5, the offset correction circuit 9, the phase sync control circuit 17, and the clock generation circuit 7, it is also possible to employ the PLL loop circuit shown in FIG. 15 comprising the A/D converter 5, the band restriction circuit 59, the phase comparison processing block 60, the LPF 61, the D/A converter 62, and the VCO 63.

This fourth embodiment employs a PLL loop circuit of the same construction as the PLL loop circuit shown in FIG. 15 instead of the PLL loop circuit 100 of the second embodiment. Accordingly, the operation and effect of the fourth embodiment are identical to those described for the second embodiment. A sampling clock 8 to be generated by the VCO 63 is set to a cycle twice as long as the channel clock, like the second embodiment.

While in the first to fourth embodiments the data demodulation circuit 26 is provided, the data demodulation circuit 26 can be dispensed with when only jitter information is required.

Further, the digital signal operation circuits 29 and 54 may be constituted by various kinds of information processing apparatuses such as a DSP (Digital Signal Processor), and furthermore, all the circuits that follow the A/D converter may be constituted by various kinds of information processing apparatuses such as a DSP.

Moreover, while the present invention is applied to a play-only optical disc device, the present invention is applicable to various kinds of disc devices such as a playback system of an optical disc device capable of recording and playback, and a playback system of a magnetic optical disc device.

APPLICABILITY IN INDUSTRY

As described above, the jitter detection apparatus according to the present invention can easily perform accurate jitter detection even during high-speed playback of optical recording media, and thereby appropriate signal reproduction and servo control are realized, and therefore, it is applicable to a DVD player or a DVD recorder.

Further, since accurate jitter detection is possible at low power consumption even during high-speed playback, it is applicable to optical disc drives that require low power consumption, such as a digital video handy movie equipped with a recording type optical disc, and a notebook personal computer.

What is claimed is:

1. A jitter detection apparatus for detecting jitters which occur when playing an optical recording medium on which digital data are recorded using recording codes having a restriction that at least three same codes should be continued, comprising:

a playback signal detection circuit for detecting a playback Radio Frequency (RF) signal from the optical recording medium;

a PLL circuit for sampling the playback RF signal with a sampling clock that is synchronized with a cycle twice as long as a clock component included in the playback RF signal to output a digital RF signal after removal of an offset in an amplitude direction;

a Nyquist interpolation filter for receiving, as an input signal, the offset-removed digital RF signal, and generating a first demodulation preprocessing signal for delaying the input signal by a predetermined period of time, and a second demodulation preprocessing signal which is a missing component in a time direction;

a jitter detection preprocessing circuit for thinning out the first and second demodulation preprocessing signals at predetermined intervals according to the playback speed of the optical recording medium, in positions where the first demodulation preprocessing signal and the second demodulation preprocessing signal have opposite polarities, thereby extracting a capture signal which indicates a jitter detection source signal from which jitter information is to be extracted, and a hold timing of the jitter detection source signal, and outputting the capture signal; and a digital signal operation circuit for holding the jitter detection source signal at the hold timing indicated by the capture signal, and extracting jitter information from the jitter detection source signal.

2. A jitter detection apparatus as defined in claim 1 further including a playback RF signal adjustment circuit for performing adjustment of amplitude of the playback RF signal as well as jitter adjustment, which is disposed between the playback signal detection circuit and the PLL circuit.

3. A jitter detection apparatus as defined in claim 2 wherein said PLL circuit includes:

a clock generation circuit for generating a sampling clock that is synchronized with a cycle twice as long as a clock component included in the playback RF signal;

an analog-to-digital (A/D) converter for generating a digital RF signal by sampling an output signal of the playback RF signal adjustment circuit with the sampling clock;

an offset correction circuit for correcting an offset component in the amplitude direction of the digital RF signal; and a phase sync control circuit for extracting phase error information from an output signal of the offset correction circuit, and performing phase sync control of the sampling clock generated by the clock generation circuit so as to bring the phase error information close to zero.

4. A jitter detection apparatus as defined in claim 1 wherein said jitter detection preprocessing circuit includes:

an edge selection circuit for selecting either a rising edge or a falling edge in a position where the first demodulation preprocessing circuit and the second demodulation preprocessing circuit have opposite polarities;

an operation time management circuit for calculating an operation time that is required for extraction of jitter information by the digital signal operation circuit, in accordance with a pattern length of recorded codes which is selected by the edge selection circuit as well as the playback speed of the optical recording medium, and outputting an updation flag;

a holding circuit for arithmetic operation, which holds the first and second demodulation preprocessing signals in parallel with each other as the jitter detection source signal, in a position where the first demodulation preprocessing signal and the second demodulation preprocessing signal have opposite polarities, and outputs the jitter detection source signal; and a capture signal generation circuit for generating a capture signal by delaying the hold timing of the holding circuit for arithmetic operation.

5. A jitter detection apparatus as defined in claim 4 wherein said operation time management circuit generates an updation flag only one time for every N (N: positive integer) pieces of output signals from the edge selection circuit, in accordance with the playback speed of the optical recording medium.

6. A jitter detection apparatus as defined in claim 5 wherein said operation time management circuit shortens the updation flag generation cycle when the playback speed of the optical recording medium is low, and lengthens the updation flag generation cycle when the playback speed is high.

7. A jitter detection apparatus as defined in claim 1 wherein said digital signal operation circuit includes:

first and second jitter source signal holding circuits for holding the jitter detection source signal at the hold timing of the capture signal;

an averaging circuit for averaging output signals of the first and second jitter source holding circuits;

a subtraction circuit for calculating a difference between the output signal of the first jitter source signal holding circuit and the output signal of the second jitter source signal holding circuit;

a division circuit for dividing the output signal of the averaging circuit by the output signal of the subtraction circuit; and a jitter operation circuit for squaring the output signal of the division circuit, and adding the resultant signal by M times (M: integer not less than 2) with the cycle of the capture signal and averaging the signal, and then raising the signal to the power of $½$, thereby detecting the jitter information.

8. A jitter detection apparatus as defined in claim 1 wherein said jitter detection preprocessing circuit includes:

an edge selection circuit for selecting either a rising edge or a falling edge in a position where the first demodulation preprocessing circuit and the second demodulation preprocessing circuit have opposite polarities;

an operation time management circuit for calculating an operation time that is required for extraction of jitter information by the digital signal operation circuit, in accordance with a pattern length of recorded codes which is selected by the edge selection circuit as well as the playback speed of the optical recording medium, and outputting an updation flag;

a serial holding circuit for arithmetic operation, which holds, as the jitter detection source signal, the first demodulation preprocessing signal and the second demodulation preprocessing signal having opposite polarities in a position where the updation flag outputted from the operation time management circuit matches the output signal of the edge selection circuit, in series with a time axis, and outputs the jitter detection source signal; and a capture signal generation circuit for generating a capture signal by delaying the hold timing of the serial holding circuit for arithmetic operation.

9. A jitter detection apparatus as defined in claim 8 wherein said operation time management circuit generates an updation flag only one time for every 2×L (L: positive integer) pieces of output signals from the edge selection circuit, in accordance with the playback speed of the optical recording medium.

10. A jitter detection apparatus as defined in claim 9 wherein said operation time management circuit shortens the updation flag generation cycle when the playback speed of the optical recording medium is low, and lengthens the updation flag generation cycle when the playback speed is high.

11. A jitter detection apparatus as defined in claim 8 wherein said digital signal operation circuit includes:

a timing detection circuit for determining a capture reference timing from the polarity of the capture signal and the polarity of the jitter detection source signal;

a first jitter source signal holding circuit for holding the jitter detection source signal by the capture signal, with reference to the output signal of the timing detection circuit;

a second jitter source signal holding circuit for holding the jitter detection source signal by the capture signal in a position where the polarity of the capture signal is inverted;

an averaging circuit for averaging the output signal of the first jitter source signal holding circuit and the output signal of the second jitter source signal holding circuit;

a subtraction circuit for calculating a difference between the output signal of the first jitter source signal holding circuit and the output signal of the second jitter source signal holding circuit;

a division circuit for dividing the output signal of the averaging circuit by the output signal of the subtraction circuit; and a jitter operation circuit for squaring the output signal of the division circuit, and adding the resultant signal by M times (M: integer not less than 2) with the cycle of the capture signal and averaging the signal, and then raising the signal to the power of $½$, thereby detecting the jitter information.

\* \* \* \* \*